US011449788B2

(12) United States Patent
Perona et al.

(10) Patent No.: US 11,449,788 B2
(45) Date of Patent: Sep. 20, 2022

(54) SYSTEMS AND METHODS FOR ONLINE ANNOTATION OF SOURCE DATA USING SKILL ESTIMATION

(71) Applicant: California Institute of Technology, Pasadena, CA (US)

(72) Inventors: Pietro Perona, Pasadena, CA (US); Grant Van Horn, Pasadena, CA (US); Steven J. Branson, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 839 days.

(21) Appl. No.: 15/925,417

(22) Filed: Mar. 19, 2018

(65) Prior Publication Data
US 2019/0034831 A1      Jan. 31, 2019

Related U.S. Application Data

(60) Provisional application No. 62/472,827, filed on Mar. 17, 2017.

(51) Int. Cl.
*G06N 20/00*      (2019.01)
*G06N 3/08*       (2006.01)
(Continued)

(52) U.S. Cl.
CPC ........... *G06N 20/00* (2019.01); *G06F 16/285* (2019.01); *G06F 16/48* (2019.01); *G06N 3/0454* (2013.01);
(Continued)

(58) Field of Classification Search
CPC ...... G06N 3/0454; G06N 3/0481; G06N 3/08; G06N 5/022; G06N 7/005; G06N 3/0445;
(Continued)

(56) References Cited

U.S. PATENT DOCUMENTS

| 5,309,359 | A  | 5/1994  | Katz et al.  |
| 6,636,843 | B2 | 10/2003 | Doddi et al. |

(Continued)

OTHER PUBLICATIONS

Vijayanarasimhan, Sudheendra et al., "Large-scale live active learning: Training object detectors with crawled data and crowds." International journal of computer vision 108. 1-2 (2014) (Year: 2014).*

(Continued)

*Primary Examiner* — Michael J Huntley
*Assistant Examiner* — Adam C Standke
(74) *Attorney, Agent, or Firm* — KPPB LLP

(57) ABSTRACT

Systems and methods for the annotation of source data in accordance with embodiments of the invention are disclosed. In one embodiment, a data annotation server system obtains a set of source data, provides at least one subset of source data to at least one annotator device, obtains a set of annotation data from the at least one annotator device for each subset of source data, classifies the source data based on the annotation data using a machine classifier for each subset of source data, generates annotator model data describing the characteristics of the at least one annotator device, and generates source data model data describing at least one piece of source data in the set of source data, where the source data model data includes label data identifying the estimated ground truth for each piece of source data in the set of source data.

20 Claims, 10 Drawing Sheets

(51) Int. Cl.
*G06F 16/48* (2019.01)
*G06N 20/10* (2019.01)
*G06F 16/28* (2019.01)
*G06N 3/04* (2006.01)
*G06N 5/02* (2006.01)
*G06N 7/00* (2006.01)
*G06N 5/00* (2006.01)

(52) U.S. Cl.
CPC .............. *G06N 3/0481* (2013.01); *G06N 3/08* (2013.01); *G06N 5/022* (2013.01); *G06N 7/005* (2013.01); *G06N 20/10* (2019.01); *G06N 3/0445* (2013.01); *G06N 3/0472* (2013.01); *G06N 5/003* (2013.01)

(58) Field of Classification Search
CPC ...... G06N 3/0472; G06N 5/003; G06N 20/00; G06N 20/10; G06F 16/48; G06F 16/285
See application file for complete search history.

(56) References Cited

U.S. PATENT DOCUMENTS

| | | | |
|---|---|---|---|
| 6,897,875 | B2 | 5/2005 | Zhang |
| 7,610,130 | B1 | 10/2009 | Dixon |
| 7,809,722 | B2 | 10/2010 | Gokturk et al. |
| 7,987,186 | B1 | 7/2011 | Joshi |
| 8,041,568 | B2 | 10/2011 | Strope et al. |
| 8,418,249 | B1 | 4/2013 | Nucci et al. |
| 8,706,729 | B2 | 4/2014 | Perona et al. |
| 8,818,793 | B1 | 8/2014 | Bangalore et al. |
| 8,849,648 | B1 | 9/2014 | Bangalore et al. |
| 9,239,848 | B2 | 1/2016 | Liu et al. |
| 9,311,599 | B1 | 4/2016 | Attenberg et al. |
| 9,344,466 | B1 | 5/2016 | Abuzalaf |
| 9,355,167 | B2 | 5/2016 | Gomes et al. |
| 9,355,359 | B2 | 5/2016 | Welinder et al. |
| 9,355,360 | B2 | 5/2016 | Welinder et al. |
| 9,483,794 | B2 | 11/2016 | Amtrup et al. |
| 9,704,106 | B2 | 7/2017 | Welinder et al. |
| 9,898,701 | B2 | 2/2018 | Welinder et al. |
| 9,928,278 | B2 | 3/2018 | Welinder et al. |
| 10,157,217 | B2 | 12/2018 | Parness et al. |
| 2004/0194021 | A1 | 9/2004 | Marshall et al. |
| 2004/0261016 | A1 | 12/2004 | Glass et al. |
| 2006/0129596 | A1 | 6/2006 | Bays |
| 2006/0288272 | A1 | 12/2006 | Kender et al. |
| 2007/0008321 | A1 | 1/2007 | Gallagher et al. |
| 2008/0005064 | A1 | 1/2008 | Sarukkai et al. |
| 2008/0016102 | A1 | 1/2008 | Albornoz |
| 2009/0307256 | A1 | 12/2009 | Tittagura |
| 2010/0023553 | A1 | 1/2010 | Gausman |
| 2010/0153318 | A1 | 6/2010 | Branavan et al. |
| 2011/0274334 | A1 | 11/2011 | Zhu |
| 2012/0158620 | A1 | 6/2012 | Paquet |
| 2012/0221508 | A1 | 8/2012 | Chaturvedi |
| 2013/0024457 | A1 | 1/2013 | Chua et al. |
| 2013/0031457 | A1 | 1/2013 | Griffiths et al. |
| 2013/0054636 | A1 | 2/2013 | Tang |
| 2013/0080422 | A1 | 3/2013 | Pan |
| 2013/0097164 | A1 | 4/2013 | Welinder et al. |
| 2013/0185049 | A1 | 7/2013 | Zhao et al. |
| 2013/0326325 | A1 | 12/2013 | De et al. |
| 2014/0188879 | A1 | 7/2014 | Welinder et al. |
| 2014/0289246 | A1* | 9/2014 | Gomes .............. G06F 16/24573 707/737 |
| 2014/0304270 | A1 | 10/2014 | Torkamani et al. |
| 2015/0011401 | A1 | 1/2015 | Davicioni et al. |
| 2015/0154284 | A1 | 6/2015 | Pfeifer et al. |
| 2015/0356243 | A1 | 12/2015 | Andreassen et al. |
| 2016/0012050 | A1 | 1/2016 | Bursey et al. |
| 2016/0275173 | A1 | 9/2016 | Gomes et al. |
| 2016/0275417 | A1 | 9/2016 | Welinder et al. |
| 2016/0275418 | A1 | 9/2016 | Welinder et al. |
| 2017/0121763 | A1 | 5/2017 | Bram et al. |
| 2017/0293682 | A1 | 10/2017 | Pfeifer et al. |

OTHER PUBLICATIONS

Platt, John. "Probabilistic outputs for support vector machines and comparisons to regularized likelihood methods." Advances in large margin classifiers 10.3 (1999) (Year: 1999).*
Niu, Xiao-Xiao et al., "A novel hybrid CNN-SVM classifier for recognizing handwritten digits." Pattern Recognition 45.4 (2012) (Year: 2012).*
Yao, Angela, et al. "Interactive object detection." 2012 IEEE conference on computer vision and pattern recognition. IEEE, 2012 (Year: 2012).*
Kovashka, Adriana, et al. "Crowdsourcing in computer vision." arXiv preprint arXiv:1611.02145 (Year: 2016).*
Long, Chengjiang, et al. "Active visual recognition with expertise estimation in crowdsourcing." Proceedings of the IEEE International Conference on Computer Vision. (Year: 2013).*
Russakovsky, Olga et al. "Best of both worlds: human-machine collaboration for object annotation." Proceedings of the IEEE conference on computer vision and pattern recognition. (Year: 2015).*
Vijayanarasimhan, Sudheendra, and Kristen Grauman. "Large-scale live active learning: Training object detectors with crawled data and crowds." International journal of computer vision 108.1 (Year: 2014).*
Welinder, Peter, et al. "The multidimensional wisdom of crowds." Advances in neural information processing systems 23 (Year: 2010).*
Niu, Xiao-Xiao, and Ching Y. Suen. "A novel hybrid CNN-SVM classifier for recognizing handwritten digits." Pattern Recognition 45.4 (Year: 2012).*
Platt, John. "Probabilistic outputs for support vector machines and comparisons to regularized likelihood methods." Advances in large margin classifiers 10.3 (Year: 1999).*
Yao, Angela, et al. "Interactive object detection." 2012 IEEE conference on computer vision and pattern recognition. IEEE (Year: 2012).*
Zhao, Liyue. "Active Learning With Unreliable Annotations." (Year: 2013).*
Russell et al., "LabelMe: A Database and Web-Based Tool for Image Annotation", Int. J. Comut. Vis., 2008, vol. 77, pp. 157-173.
Seeger, "Learning with labeled and unlabeled data", Technical Report, University of Edinburgh, 2002, 62 pgs.
Shah et al., "Double or Nothing? Multiplicative Incentive Mechanisms for Crowdsourcing", in Advances in Neural Information Processing Systems, 2015, pp. 1-9, arXiv:1408.1387.
Sheng et al., "Get Another Label? Improving Data Quality and Data Mining Using Multiple, Noisy Labelers", KDD, 2008, Aug. 24-27, 2008, pp. 614-622.
Siddiquie et al., "Beyond Active Noun Tagging: Modeling Contextual Interactions for Multi-Class Active Learning", 2010 IEEE Conference on Computer Vision and Pattern Recognition (CVPR), pp. 2979-2986.
Smyth et al., "Inferring Ground Truth from Subjective Labelling of Venus Images", NIPS, 1995, pp. 1085-1092.
Snow et al., "Cheap and Fast—But is it Good? Evaluating Non-Expert Annotations for Natural Language Tasks", EMNLP, 2008, 10 pgs.
Sorokin et al., "Utility data annotation with Amazon Mechanical Turk", First IEEE Workshop on Internet Vision at CVPR '08, 2008, 8 pgs.
Spain et al., "Some objects are more equal than others: measuring and predicting importance", ECCV, 2008, 14 pgs.
Strehl et al., "Cluster Ensembles—A Knowledge Reuse Framework for Combinint Multiple Partitions", Journal of Machine Learning Research, 2002, vol. 3, pp. 583-617.
Sullivan et al., "The eBird enterprise: An integrated approach to development and application of citizen science", Biological Conservation, Jan. 2014, vol. 169, pp. 31-40.
Sutskever et al., "Modelling Relational Data Using Bayesian Clustered Tensor Factorization", Advances in Neural Information Processing Systems (NIPS), Jan. 1, 2009, 8 pgs.

(56) References Cited

OTHER PUBLICATIONS

Szegedy et al., "Going deeper with convolutions", 2015 IEEE Conference on Computer Vision and Pattern Recognition (CVPR), Jun. 7-12, 2015, pp. 1-9.
Szegedy et al., "Rethinking the Inception Architecture for Computer Vision", Computer Vision and Pattern Recognition, Dec. 11, 2015, retrieved from https://arxiv.org/abs/1512.00567, 10 pages.
Tamuz et al., "Adaptively Learning the Crowd Kernel", In ICML, May 5, 2011, pp. 673-680, arXiv:1105.1033.
Tian et al., "Max-Margin Majority Voting for Learning from Crowds", in Advances in Neural Information Processing Systems, 2015m oo, 1621-1629.
Tong et al, "Support Vector Machine Active Learning with Applications to Text Classification", Journal of Machine Learning Research, 2001, pp. 45-66.
Ueda, "iNaturalist Research-grade Observations via GBIF.org", https://doi.org/10.15468/ab35x, 2017.
Van Horn et al., "Building a bird recognition app and large scale dataset with citizen scientists: the fine print in fine-grained dataset collection", in Proceedings of the IEEE Conference on Computer Vision and Pattern Recognition, Jun. 2015, pp. 595-604.
Van Horn et al., "Lean Multiclass Crowdsourcing", CVPR 2018 Submission #1324, 10 pgs.
Vempaty et al., "Reliable Crowdsourcing for Multi-Class Labeling Using Coding Theory", IEEE Journal of Selected Topics in Signal Processing, Jan. 22, 2014, vol. 8, No. 4, pp. 667-679.
Vijayanarasimhan et al, "Large-Scale Live Active Learning: Training Object Detectors with Crawled Data and Crowds", CVPR, 2001, pp. 1449-1456.
Vijayanarasimhan et al, "Multi-Level Active Prediction of Useful Image Annotations for Recognition", in Advances in Neural Information Processing Systems, Dec. 2009, pp. 1705-1712.
Vijayanarasimhan et al., "What's It Going to Cost You?: Predicting Effort vs. Informataiveness for Multi-Label Image Annotations", CVPR, 2009, pp. 2262-2269.
Viola et al., "Robust Real-Time Face Detection", IJCV, May 1, 2004, Printed from: http://www.vision.caltech.edu/htm-files/EE148-2005-Spring/pprs/viola04ijcv.pdf, pp. 137-154.
Von Ahn et al., "ESP: Labeling Images with a Computer Game", in AAAI Spring Symposium: Knowledge Collection from Volunteer Contributors, 2005, vol. 2, 8 pgs.
Von Ahn et al., "Labeling Images with a Computer Game", SIGCHI conference on Human factors in computing systems, 2004, pp. 319-326.
Von Ahn et al., "reCAPTCHA: Human-Based Character Recognition via Web Security Measures", Science, 2008, vol. 321, No. 5895, pp. 1465-1468.
Vondrick et al, "Efficiently Scaling up Video Annotation with Crowdsourced Marketplaces", ECCV, 2010, pp. 610-623.
Vondrick et al., "Efficiently Scaling Up Crowdsourced Video Annotation", International Journal of Computer Vision, 2013, vol. 101, No. 1, pp. 184-204, published online Sep. 5, 2012.
Wah et al., "Multiclass recognition and part localization with humans in the loop", in 2011 International Conference on Computer Vision, 2011, pp. 2524-2531.
Wah et al., "Similarity Comparisons for Interactive Fine-Grained Categorization", in Proceedings of the IEEE Conference on Computer Vision and Pattern Recognition, Jun. 2014, pp. 859-866.
Wah et al., "The Caltech-UCSD birds-200-2011 dataset".
Wald, "Sequential Tests of Statistical Hypotheses", Ann. Math. Statist, Jun. 1, 1945, vol. 16, No. 2, pp. 117-186.
Wang et al., "Quality-based pricing for crowdsourced workers", NYU Stern Research Working Paper, CBA-13-06, Jun. 12, 2013, 46 pgs.
Welinder et al., "Caltech-UCSD Birds 200", Technical Report CNS-TR-2010-001, 2001, 15 pgs.
Welinder et al., "Online crowdsourcing: rating annotators and obtaining cost-effective labels", IEEE Conference on Computer Vision and Pattern Recognition Workshops (ACVHL), 2010, pp. 25-32.

Welinder et al., "The Multidimensional Wisdom of Crowds", Neural Information Processing Systems Conference (NIPS), 2010, pp. 2424-2432.
Whitehill et al, "Whose Vote Should Count More: Optimal Integration of Labels from Labelers of Unknown Expertise", in Advances in Neural Information Processing Systems (NIPS), 2009, 9 pgs.
Wickens, "Elementary Signal Detection Theory", Oxford University Press, Oct. 11, 2001, 20 pgs.
Wilber et al., "Cost-effective HITs for relative similarity comparisons", in Second AAAI Conference on Human Computation and Crowdsourcing, Apr. 12, 2014, arXiv:1404.3291, 7 pgs.
Yao et al., "Interactive object detection", in 2012 Conference on Computer Vision and Pattern Recognition (CVPR), Jun. 2012, pp. 3242-3249.
Yosinski et al., "How transferable are features in deep neural networks?", in Advances in Neural Information Processing Systems, Nov. 6, 2014, vol. 27, 14 pgs., arXiv:1411.1792.
Yuen et al., "LabelMe video: Building a Video Database with Human Annotations", In ICCV, Sep. 1, 2009, 8 pgs.
Zhang et al., "Multi-class ground truth inference in crowdsourcing with clustering", IEEE Transactions on Knowledge and Data Engineering, Apr. 2016, vol. 28, No. 4, pp. 1080-1085.
Zhang et al., "Spectral Methods Meet EM: A Provably Optimal Algorithm for Crowdsourcing", in Advances in Neural Information Processing Systems, Nov. 1, 2014, pp. 1260-1268, arXiv:1406.3824.
Zhao et al., "Robust Active Learning Using Crowdsourced Annotations for Activity Recognition", In Human Computation: Papers from the 2011 AIII Workshop, Jan. 2011, pp. 74-79.
Zhou et al., "Aggregating Ordinal Labels from Crowds by Mimimax Conditional Entropy", in Proceedings of the 31st International Conference on Machine Learning, Jun. 2014, pp. 262-270.
Zhou et al., "Learning from the Wisdom of Crowds by Minimax Entropy", in Advances in Neural Information Processing Systems, Dec. 2012, pp. 2195-2203.
Zhu, "Semi-Supervised Learning Literature Survey", Technical report, University of Wisconsin-Madison, 2008, 60 pgs.
Ertekin et al., "Wisely Using a Budget for Crowdsourcing", OR 392-12. Massachusetts Institute of Technology, Apr. 2012, 31 pgs.
Agrawal et al., "Analyzing the performance of multilayer neural networks for object recognition", in European Conference on Computer Vision, 2014, pp. 329-344, arXiv:1407.1610, Sep. 22, 2014.
Antoniak, "Mixtures of Dirchlet Processes with Applications to Bayesian Nonparametric Problems", The Annals of Statistics, 1974, vol. 2, No. 6, pp. 1152-1174.
Attias, "A Variational Bayesian Framework for Graphical Models", NIPS, 1999, pp. 209-215.
Bennett, "Using Asymmetric Distributions to Improve Classifier Probabilities A Comparison of New and Standard Parametric Methods", Technical Report, Carnegie Mellon University, 2002, 24 pgs.
Berg et al., "Automatic Attribute Discovery and Characterization from Noisy Web Data", Computer Vision—ECCV 2010, pp. 663-676, Dec. 2010.
Beygelzimer et al., "Importance Weighted Active Learning", Proceedings of the 26th International Conference on Machine Learning, 2009, 8 pgs.
Biederman et al., "Sexing Day-Old Chicks: A Case Study and Expert Systems Analysis of a Difficult Perceptual-Learning Task", Journal of Experimental Psychology: Learning, Memory and Cognition, Oct. 1, 1987, vol. 13, No. 4, pp. 640-645.
Biswas et al., "Simultaneous Active Learning of Classifiers & Attributes via Relative Feedback", in Proceedings of the IEEE Conference on Computer Vision and Pattern Recognition, pp. 644-651.
Bitton, E., "Geometric Models for Collaborative Search and Filtering", Thesis, Spring 2011, 185 pgs.
Bourdev et al., "Poselets: Boyd Part Detectors Trained Using 3D Human Pose Annotations", ICCV, 2009, 42 pgs.
Branson et al., "High-throughput ethomics in large groups of *Drosophila*", Nature Methods, vol. 6, pp. 451-457, doi:10.1038/nmeth.1328, May 3, 2009.

(56) References Cited

OTHER PUBLICATIONS

Branson et al., "Lean Crowdsourcing: Combining Human and Machines in an Online System", in Proceedings of the IEEE Conference on Computer Vision and Pattern Recognition, Jul. 2017, pp. 7474-7483.
Branson et al., "Visual recognition with humans in the loop", in European Conference on Computer Vision, 2010, Springer, pp. 438-451.
Byrd et al., "A Limited Memory Algorithm for Bound Constrained Optimization", SIAM Journal on Scientific and Statistical Computing, 1995, vol. 16, No. 5, pp. 1190-1208.
Carlson et al., "Toward an Architecture for Never-Ending Language Learning", in AAAI, Jul. 10, 2010, 8 pgs.
Chilton et al., "Cascade: Crowdsourcing Taxonomy Creation", in Proceedings of the SIGCHI Conference on Human Factors in Computing Systems, ACM, Apr. 2013, pp. 1999-2008.
Cohn et al., "Active Learning with Statistical Models", Journal of Artificial Intelligence Research, 1996, vol. 4, pp. 129-145.
Cox, "The Optimal Number of Response Alternatives for a Scale: A Review.", Journal of Marketing Research, vol. 17, No. 4, Nov. 1980, pp. 407-422.
Dalal et al., "Histograms of Oriented Gradients for Human Detection", ICCV, 2005, 8 pgs.
Dalvi et al., "Aggregating crowdsourced binary ratings", in Proceedings of the 22nd international Conference on World Wide Web, ACM, 2013, pp. 285-294.
Dankert et al., "Automated Monitoring and Analysis of Social Behavior in Ddrosophila", Nat. Methods, Apr. 2009, vol. 6, No. 4, pp. 297-303.
Dasgupta et al., "Hierarchical Sampling for Active Learning", ICML, 2008, 8 pgs.
Davvid et al., "Maximum Likelihood Estimation of Observer Error-rates using the EM Algorithm", J. Roy. Statistical Society, Series C, 1979, vol. 28, No. 1, pp. 20-28.
Dempster et al., "Maximum likelihood from Incomplete Data via the EM Algorithm", Journal of the Royal statistical Society, Series B (Methodological, Dec. 8, 1976, vol. 39, No. 1, pp. 1-38.
Deng et al., "Fine-Grained Crowdsourcing for Fine-Grained Recognition", in Proceedings of the IEEE Conference on Computer Vision and Pattern Recognition, 2013, pp. 580-587.
Deng et al., "Hedging Your Bets: Optimizing Accuracy-Specificity Trade-offs in Large Scale Visual Recognition", Computer Vision and Pattern Recognition (CVPR), 2012 IEEE Conference on Jun. 16-21, 2012, pp. 3450-3457.
Deng et al., "ImageNet: A Large-Scale Hierarchical Image Database", 2009 IEEE Conference on Computer Vision and Pattern Recognition, Jun. 20-25, 2009, pp. 248-255.
Deng et al., "Scalable multi-label Annotation", in Proceedings of the SIGCHI Conference on Human Factors in Computing Systems, ACM, 2014, pp. 3099-3102.
Dollar et al., "Cascaded Pose Regression", CVPR, 2010, pp. 1078-1085.
Dollar et al., "Pedestrian Detection: An Evaluation of the State of the Art", IEEE Transactions on Pattern Analysis and Machine Intelligence, 2011, 20 pgs.
Erkanli et al., "Bayesian semi-parametric ROC analysis", Statistics in Medicine, 2006, vol. 25, pp. 3905-3928.
Erlenkotter, "A dual-based procedure for uncapacitated facility location", Operations Research, Dec. 1978, vol. 25, No. 6, pp. 992-1009.
Ertekin et al., "Learning to predict the wisdom of crowds", Proceedings, CI 2012, Apr. 16, 2012, 8 pgs., arXiv preprint arXiv:1204.3611 v1.
Everingham et al., "The Pascal Visual Object Classes (VOC) Challenge", International Journal of computer Vision, Jun. 1, 2010, vol. 88, No. 2, pp. 303-338.
Fei-Fei et al., "A Bayesian Hierarchical Model for Learning Natural Scene Categories", CVPR, IEEE Computer Society, 2005, pp. 524-531.

Fei-Fei et al., "Learning Generative Visual Models from Few Training Examples: An Incremental bayesian Approach Tested on 101 Object Categories", Computer Vision and Image Understanding, Apr. 1, 2007, 9 pgs.
Fergus et al., "Object Class Recognition by Unsupervised Scale-Invariant Learning", in CVPR, vol. 2, Jun. 18, 2003, pp. 264-271.
Frank et al., "UCI Machine Learning Repository", 2010, 3 pgs.
Fuchs et al., "Randomized tree ensembles for object detection in computational pathology", Lecture Notes in Computer Science, ISVC, 2009, vol. 5875, pp. 367-378.
Fuchs et al., "Weakly Supervised Cell Nuclei Detection and Segmentation on Tissue Microarrays of Renal Clear Cell Carcinoma", DAGM 2008, LNCS 5096, Jun. 10, 2008, pp. 173-182.
Ghosh et al., "Who Moderates the Moderators? Crowdsourcing Abuse Detection in User-Generated Content", in Proceedings of the 12th ACM Conference on Electronic Commerce, ACM 2011, pp. 167-176.
Gionis et al., "Clustering Aggregation", ACM Transactions on Knowledge Discovery from Data, 2007. vol. 1, 30 pgs.
Gomes et al., "Crowdclustering", Technical Report, Caltech 20110628-202526159, Jun. 2011, 14 pgs.
Gomes et al., "Crowdclustering", Technical Report, Caltech, 2011, pp. 558-561.
Gu et al, "Bayesian bootstrap estimation of ROC curve", Statistics in Medicine, 2008, vol. 27, pp. 5407-5420.
Gurari et al., "How to Collect Segmentations for Biomedical Images: A Benchmark Evaluating the Performance of Experts, Crowdsourced Non-Experts, and Algorithms", in 2015 IEEE Winter Conference on Applications of Computer Vision, 2015, pp. 1169-1176.
Hall et al., "Fine-Grained Classification of Pedestrians in Video: Benchmark and State of the Art", in Proceedings of the IEEE Conference on Computer Vision and Pattern Recognition, 2015, pp. 5482-5491.
He et al., "Deep Residual Learning for Image Recognition", Computer Vision and Pattern Recognition, Dec. 10, 2015, retrieved from https://arxiv.org/abs/1512.03385, 12 pages.
Hellmich et al., "Bayesian Approaches to Meta-analysis of ROC Curves", Med. Decis. Making, Jul.-Sep. 1999, vol. 19, pp. 252-264.
Howe, "The Rise of Crowdsourcing", WIRED, Jun. 1, 2006, 16 pgs.
Hua et al., "Collaborative Active Learning of a Kernel Machine Ensemble for Recognition", in Proceedings of the IEEE International Conference on Computer Vision, 2013, pp. 1209-1216.
Huang et al., "Densely Connected Convolutional Networks", in Proceedings of the IEEE Conference on Computer Vision and Pattern Recognition, 2017, pp. 4700-4708.
Jaakkola et al., "A variational approach to Bayesian logistic regression models and their extensions", Source unknown, Aug. 13, 1996, 10 pgs.
Jain et al., "Active Image Segmentation Propagation", Computer Vision Foundation, 2016, 10 pgs.
Jain et al., "Predicting Sufficient Annotation Strength for Interactive Foreground Segmentation", in Proceedings of the IEEE International Conference on Computer Vision, 2013, pp. 1313-1320.
Jin et al., "Learning with Multiple Labels", in Advances in Neural Information Processing Systems, 2002, pp. 897-904.
Karger et al., "Budget-optimal task allocation for reliable crowdsourcing systems", Operations Research, Feb. 24, 2014, vol. 62, No. 1, pp. 1-24.
Karger et al., "Efficient Crowdsourcing for Multi-Class Labeling", ACM Sigmetrics Performance Evaluation Review, 2013, vol. 41, No. 1, pp. 81-92.
Karger et al., "Iterative Learning for Reliable Crowdsourcing Systems", in Advances in Neural Information Processing Systems, Sep. 2012, pp. 1953-1961.
Kazamzadeh et al., "ReferItGame: referring to Objects in Photographs of Natural Scenes", Proceedings of the 2014 Conference on Empirical Methods in Natural Language Processing (EMNLP), Oct. 25-29, 2014, pp. 787-798.
Khodabandeh et al., "Discovering Human Interactions in Videos with Limited Data Labeling", in Proceedings of the IEEE Conference on Computer Vision and Pattern Recognition Workshops, Jun. 2015, pp. 9-18.

(56) References Cited

OTHER PUBLICATIONS

Kovashka et al., "Actively Selecting Annotations Among Objects and Attributes", Proceedings of the International Conference on Computer Vision (ICCV), 2011, pp. 1403-1410.
Kovashka et al., "Crowdsourcing in Computer Vision", Computer Graphics and Vision, 2014, vol. 10, No. 3, pp. 177-243.
Krizhevsky et al., "ImageNet classification with Deep Convolutional Neural Networks", in Advances in Neural Information Processing Systems, 2012, pp. 1097-1105.
Kruskal, "Multidimensional Scaling by Optimizing Goodness of Fit to a Nonmetric Hypothesis", Psychometrika, Mar. 1964. vol. 29, No. 1, pp. 1-27.
Kurihara et al., "Accelerated Variational Dirichlet Process Mixtures", Advances in Neural Information Processing Systems, 2007, 8 pgs.
Lad et al., "Interactively Guiding Semi-Supervised Clustering via Attribute-based Explanations", in European Conference on Computer Vision, 2013, pp. 333-349.
Lampert et al., "Learning To Detect Unseen Object Classes by Between-Class Attribute Transfer", 2009 IEEE Conference on Computer Vision and Pattern Recognition, Jun. 20-25, 2009, pp. 951-958.
Li et al., "Error Rate Analysis of Labeling by Crowdsourcing", in International Conference on Machine Learning 2013 Workshop, 2013, 19 pgs.
Li et al., "Solving consensus and Semi-supervised Clustering Problems Using Nonnegative Matrix Factorization", ICDM, IEEE computer society 2007. pp. 577-582.
Likert, "A technique for the measurement of attitudes", Archives of Psychology, vol. 22, No. 140, Jun. 1932, 53 pgs.
Lin et al., "Microsoft COCO: Common Objects in Context", in European Conference on Computer Vision, 2014, pp. 740-755.
Linacre, "Optimizing Rating Scale Category Effectiveness", Journal of Applied Measurement, vol. 3, Issue 1, 2002, 13 pgs.
Little et al., "Exploring Iterative and Parallel Human Computational Processes", KDD-HCOMP, Jul. 25, 2010, pp. 68-76.
Little et al., "TurKit: Tools for Iterative Tasks on Mechanical Turk", HCOMP, 2009, pp. 29-30.
Littlestone et al., "The Weighted Majority Algorithm", Information and Computation, 1994, vol. 108, No. 2, pp. 212-261.
Liu et al., "Variational Inference for Crowdsourcing", in Advances in Neural Information Processing Systems (NIPS), Jul. 2012, pp. 692-700.
Lo, "On a Class of Bayesian Nonparametric Estimates: I. Density Estimates", The Annals of Statistics, Mar. 1, 1984, vol. 12, No. 1, pp. 351-357.
Long et al., "Active Visual Recognition with Expertise Estimate in Crowdsourcing", IEEE International Conference on Computer Vision, Dec. 2013, pp. 3000-3007.
Long et al., "Multi-class Multi-annotator Active Learning with Robust Gaussian Process for Visual Recognition", in Proceedings of the IEEE International Conference on Computer Vision, 2015, pp. 2839-2847.
Lowe, "Distinctive Image Features from Scale-Invariant Keypoints", Retrieved from https://www.robots.ox.ac.uk/~vgg/research/affine/det_eval_files/lowe_ijcv2004.pdf, Jan. 5, 2004, Accepted for publication in the International Journal of Computer Vision, 2004, 28 pgs.
Maceachern, "Estimating normal means with a conjugate style dirichlet process prior", Communications in Statistics, Stimulation and Computation, vol. 23, Issue 3, 1994, pp. 727-741.
Maceachern et al., "Estimating Mixture of Dirichlet Process Models", Journal of Computational and Graphical Statistics, Jun. 1998, vol. 7, No. 2, pp. 223-238.
Mackay, "Information-Based Objective Functions for Active Data Selection", Neural Computation, 1992, vol. 4, pp. 590-604.
Martinez-Munoz et al., "Dictionary-Free Categorization of Very Similar Objects via Stacked Evidence Trees", Source unknown, 2009, 8 pgs.
Meila, "Comparing Clusterings by the Variation of Information", Learning theory and Kernel machines: 16th Annual Conference of Learning Theory and 7th Kernel Workshop, COLT/Kernel 2003, 31 pgs.
Monti et al., "Consensus Clustering: A Resampling-Based Method for Class Discovery and Visualization of Gene Expression Microarray Data", Machine Learning, 2003, vol. 52, pp. 91-118.
Mora et al., "How Many Species Are There on Earth and in the Ocean?", PLoS Biology, Aug. 2011, vol. 8, Issue 8, e1001127, 8 pgs.
Nagaraja et al., "Video Segmentation with Just a Few Strokes", in Proceedings of the IEEE International Conference on Computer Vision, 2015, pp. 3235-3243.
Navalapkkam et al., "*Homo economicus* in visual search", Journal of Vision, Jan. 23, 2009, 9(1):31, pp. 1-16.
Neal, "MCMC Using Hamiltonian Dynamics", Handbook of Markov Chain Monte Carlo, 2010, pp. 113-162.
Nigam et al., "Text Classification from labeled and Unlabeled Documents Using EM", Machine Learning, 2000, vol. 39, No. 2/3, pp. 103-134.
Ok et al., "Optimality of Belief Propagation for Crowdsourced Classification", arXiv:1602.03619, Mar. 10, 2016, 19 pgs.
Oquab et al., "Learning and Transferring Mid-Level Image Representations Using Convolutional Neural Networks", IEEE Conference on Computer Vision and Pattern Recognition, Jun. 2014, 11 pgs.
Pareto, "Cours d'economie politique", 1896, 430 pgs. (presented in four parts).
Parkash et al., "Attributes for Classifier Feedback", in European Conference on Computer Vision, Springer, 2012, pp. 354-368.
Platt, "Probabilistic Outputs for Support Vector Machines and Comparisons to Regularized Likelihood Methods", Advances in Large Margin Classiers, 1999, MIT Press, pp. 61-74.
Raykar et al., "Learning From Crowds", Journal of Machine Learning Research, Apr. 2010, vol. 11, pp. 1297-1322.
Raykar et al., "Supervised Learning from Multiple Experts: Whom to trust when everyone lies a bit", ICML, 2009, 8 pgs.
Rubinstein et al., "Annotation Propagation in Large Image Databases via Dense Image Correspondence", in European Conference on Computer Vision, Oct. 2012, pp. 85-99.
Russakovsky et al., "Best of both worlds: human-machine collaboration for object annotation", in Proceedings of the IEEE Conference on Computer Vision and Pattern Recognition, 2015, pp. 2121-2131.

\* cited by examiner

---

Algorithm 1 Online Crowdsourcing

1: input: unlabeled images $X = \{x_i\}_{i=1}^{N}$
2: Initialize unfinished/finished sets: $U \leftarrow \{i\}_{i=1}^{N}$, $F \leftarrow \emptyset$
3: Initialize $W, I$ using prior probabilities
4: repeat
5:   Select a batch $B \subseteq U$ of unfinished examples
6:   For $i \in B$ obtain new crowd label $z_{ij}$: $Z_i \leftarrow Z_i \cup z_{ij}$
7:   repeat   ▷ Max likelihood estimation
8:     Estimate dataset-wide priors $p(d_i)$, $p(w_j)$
9:     Predict true labels:
       $\forall_i, \hat{y}_i \leftarrow \arg\max_{y_i} p(y_i|x_i, \hat{\theta}) p(Z_i|y_i, \hat{d}_i, \hat{W})$
10:    Predict image difficulties:
       $\forall_i, \hat{d}_i \leftarrow \arg\max_{d_i} p(d_i) p(Z_i|\hat{y}_i, d_i, \hat{W})$
11:    Predict worker parameters:
       $\forall_j, \hat{w}_j \leftarrow \arg\max_{w_j} p(w_j) \prod_{i \in \mathcal{I}_j} p(z_{ij}|\hat{y}_i, \hat{d}_i, w_j)$
12:  until Until convergence
13:  Using $K$-fold cross-validation, train computer vision on dataset $\{(x_i, \hat{y}_i)\}_{i,|W_i|>0}$, and calibrate probabilities $p(y_i|x_i, \hat{\theta}_k)$
14:  Predict true labels:
     $\forall_i, \hat{y}_i \leftarrow \arg\max_{y_i} p(y_i|x_i, \hat{\theta}) p(Z_i|y_i, \hat{d}_i, \hat{W})$
15:  for $i \in B$ do   ▷ Check for finished labels
16:    $\mathcal{R}_i \leftarrow \dfrac{\int_{y_i} \ell(y_i, \hat{y}_i) p(y_i|x_i, \hat{\theta}) \prod_{j \in W_i} p(z_{ij}|y_i, \hat{d}_i, \hat{w}_j)}{\int_{y_i} p(y_i|x_i, \hat{\theta}) \prod_{j \in W_i} p(z_{ij}|y_i, \hat{d}_i, \hat{w}_j)}$
17:    if $\mathcal{R}_i \leq \tau_c$: $F \leftarrow F \cup i$, $U \leftarrow U \setminus i$
18:  end for
19: until $U = \emptyset$
20: return $Y \leftarrow \{\hat{y}_i\}_{i=1}^{N}$

SYSTEMS AND METHODS FOR ONLINE ANNOTATION OF SOURCE DATA USING SKILL ESTIMATION

CROSS-REFERENCE TO RELATED APPLICATIONS

The current application claims priority to U.S. Provisional Patent Application No. 62/472,827, titled "Lean Online Crowdsourcing" and filed Mar. 17, 2017, the disclosure of which is hereby incorporated by reference in its entirety.

STATEMENT OF FEDERAL FUNDING

This invention was made with government support under Grant No. N00014-10-1-0933 awarded by the Office of Naval Research. The government has certain rights in the invention.

FIELD OF THE INVENTION

The present invention is generally related to data annotation and more specifically the determination of annotator performance in the distributed annotation of source data.

BACKGROUND

Amazon Mechanical Turk is a service provided by Amazon.com of Seattle, Wash. Amazon Mechanical Turk provides the ability to submit tasks and have a human complete the task in exchange for a monetary reward for completing the task.

SUMMARY OF THE INVENTION

Systems and methods for the multiclass annotation of source data in accordance with embodiments of the invention are disclosed. In one embodiment, a data annotation server system includes a processor and a memory, wherein the processor obtains a set of source data, provides at least one subset of source data to at least one annotator device, obtains a set of annotation data from the at least one annotator device for each subset of source data, classifies the source data based on the annotation data using a machine classifier for each subset of source data, generates annotator model data describing the characteristics of the at least one annotator device, and generates source data model data describing at least one piece of source data in the set of source data, where the source data model data includes label data identifying the estimated ground truth for each piece of source data in the set of source data.

In yet another additional embodiment of the invention, the processor further generates active learning data for at least one subset of source data, where the active learning data includes instructions for annotating the subset of source data and provides the active learning data to the at least one annotator device.

In yet still another additional embodiment of the invention, the processor further trains the machine classifier using the annotator model data.

In still another additional embodiment of the invention, the processor further trains the machine classifier using the source data model data.

In yet still another additional embodiment of the invention, the machine classifier includes a linear support vector machine classifying features identified using a convolutional neural network followed by probability calibration using Platt scaling.

In yet another embodiment of the invention, the machine classifier estimates the label data for a piece of source data by calculating the confidence in the set of annotation data for the piece of source data with a probability estimate $$p(y_i|x_i,\theta)=\sigma(\gamma\theta\cdot\phi(x_i))$$

where $\phi(x_i)$ is a CNN feature vector, $\theta$ is a learned SVM weight vector, $\gamma$ is probability calibration scalar from Platt scaling, and $\sigma(\ )$ is the sigmoid function.

In yet still another embodiment of the invention, the annotation data includes a location of the annotation within the piece of source data.

In yet another additional embodiment of the invention, the annotation data includes a part keypoint annotation map storing the value of $p(y_i|x_i, \theta)$ for each possible value of $y_i$, where $\mathbb{Z}_{ij}$ is a corresponding vector of length $|x_i|$ at each annotation location and the vector $$\mathbb{Y}_i = \mathbb{X}_i \Pi_{j \in W_i} \mathbb{Z}_{ij}$$

stores the likelihood of all possible values of $y_i$.

In still another additional embodiment of the invention, the annotation data includes a bounding box identifying the location of the annotation within the piece of source data.

In yet still another additional embodiment of the invention, the processor further calculates the risk associated with a plurality of annotations for a piece of source data by calculating when a pair of bounding boxes match by calculating if their area of intersection over union is at least 50%

Still another embodiment of the invention includes a method including obtaining a set of source data using a data annotation server system including a processor and a memory, providing at least one subset of source data to at least one annotator device using the data annotation server system, obtaining a set of annotation data from the at least one annotator device for each subset of source data using the data annotation server system, classifying the source data based on the annotation data using a machine classifier for each subset of source data using the data annotation server system, generating annotator model data describing the characteristics of the at least one annotator device using the data annotation server system, and generating source data model data describing at least one piece of source data in the set of source data using the data annotation server system, where the source data model data includes label data identifying the estimated ground truth for each piece of source data in the set of source data.

In yet another embodiment of the invention, the method further includes generating active learning data for at least one subset of source data using the data annotation server system, where the active learning data includes instructions for annotating the subset of source data and providing the active learning data to the at least one annotator device using the data annotation server system.

In still another embodiment of the invention, the method further includes training the machine classifier based on the annotator model data using the data annotation server system.

In yet still another embodiment of the invention, the method further includes training the machine classifier based on the source data model data using the data annotation server system.

In yet another additional embodiment of the invention, the machine classifier includes a linear support vector machine (SVM) classifying features identified using a convolutional neural network followed by probability calibration using Platt scaling.

In still another additional embodiment of the invention, the machine classifier estimates the label data for a piece of source data by calculating the confidence in the set of annotation data for the piece of source data with a probability estimate $$p(y_i|x_i,\theta)=\sigma(\gamma\theta\cdot\phi(x_i))$$

where $\phi(x_i)$ is a CNN feature vector, $\theta$ is a learned SVM weight vector, $\gamma$ is probability calibration scalar from Platt scaling, and $\sigma(\ )$ is the sigmoid function.

In yet still another additional embodiment of the invention, the annotation data includes a location of the annotation within the piece of source data.

In yet another embodiment of the invention, the annotation data includes a part keypoint annotation map storing the value of $p(y_i|x_i, \theta)$ for each possible value of $y_i$, where $\mathbb{Z}_{ij}$ is a corresponding vector of length$|x_i|$ at each annotation location and the vector $$\mathbb{Y}_i = \mathbb{X}_{i,} \Pi_{j \in W_i} \mathbb{Z}_{ij}$$

stores the likelihood of all possible values of $y_i$.

In still another embodiment of the invention, the annotation data includes a bounding box identifying the location of the annotation within the piece of source data.

In yet still another additional embodiment of the invention, the method further includes calculating the risk associated with a plurality of annotations for a piece of source data using the data annotation server system by calculating when a pair of bounding boxes match by calculating if their area of intersection over union is at least 50%.

Other objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the claims.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIG. 3 is pseudo-code of a process for the multiclass annotation of source data in accordance with an embodiment of the invention;

DETAILED DESCRIPTION

Figure 1A:
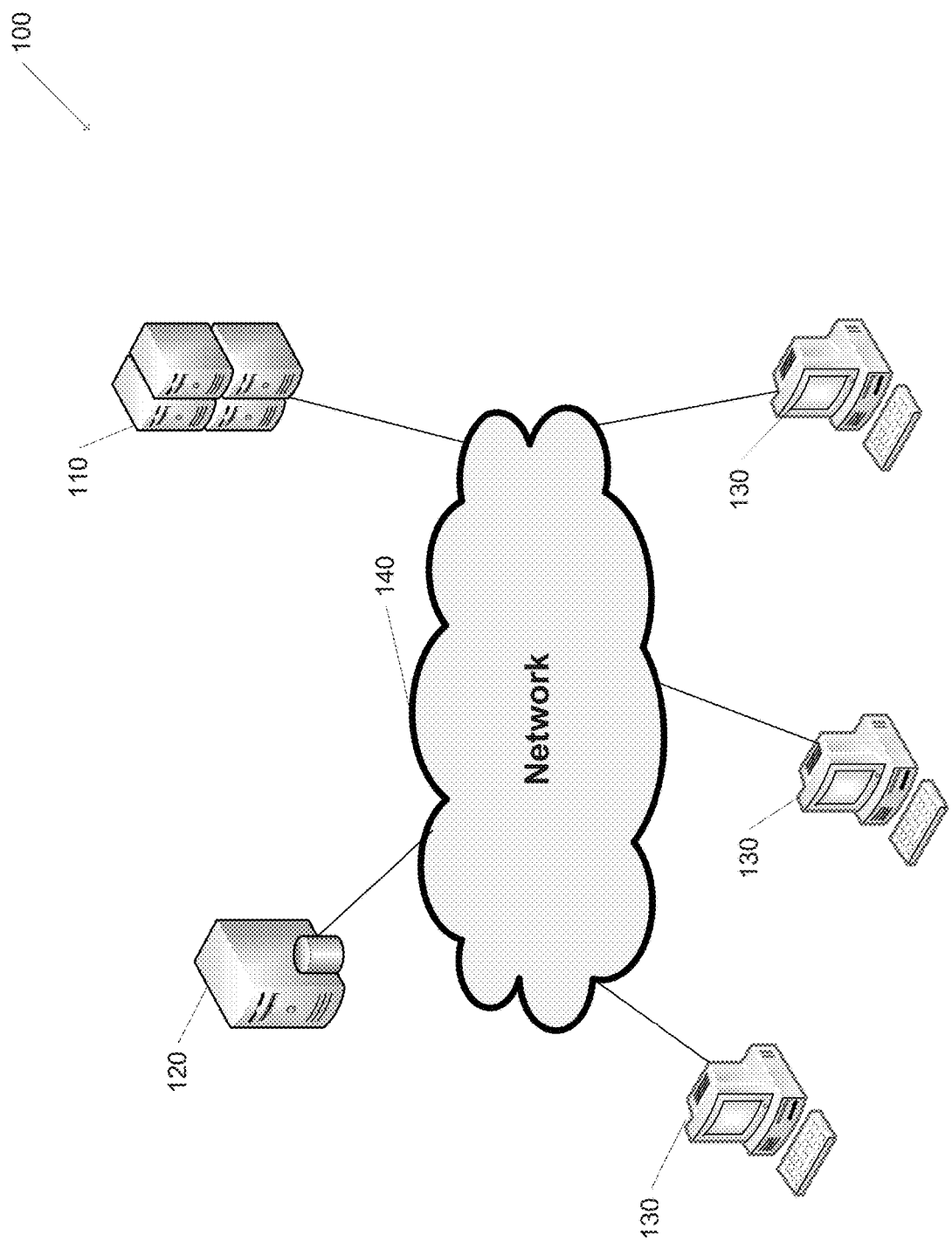
FIG. 1A is a conceptual illustration of a multiclass data annotation system in accordance with an embodiment of the invention.

Turning now to the drawings, systems and methods for the multiclass annotation of source data in accordance with embodiments of the invention are disclosed. A variety of computer vision systems utilize large annotated datasets, such as the ImageNet project, for training purposes. While sophisticated crowdsourcing algorithms have been developed for classification of images, there is a relative lack of methods and tools that use crowdsourcing algorithms for other types of data annotation. Multiclass crowdsourcing is emerging as an important technique in science and industry. A growing number of websites support sharing observations (such as photographs) of specimens from the natural world and facilitate collaborative, community-driven identification of those observed annotations. The result is an even larger collection of observations, but with potentially noisier annotations as the number of people taking photos and submitting observations far outpaces the speed at which experts can verify them. Indeed, the benefits of existing annotation systems, like majority vote, are lost when the skill of the people contributing annotations is uncertain. Thus, there is need for improved methods to integrate multiple annotations into a final (species) label. In many embodiments, the information is aggregated into datasets that enable a variety of studies to be performed and the annotation accuracy of these datasets can have a direct impact on science, conservation, and policy.

Multiclass data annotation systems and processes in accordance with embodiments of the invention allow for the efficient annotation and characterization of arbitrary source data and annotators. In particular, multiclass data annotation processes greatly reduce the amount of annotations required when crowdsourcing a variety of annotations such as, but not limited to, bounding boxes, part keypoint, and multiclass annotations. In many embodiments, multiclass data annotation processes include determining the strength of agreement between annotators by incrementally collecting a variable number of annotations per piece of source data based on calculated estimates of confidence. For example, if two annotators identify the same pixel location when annotating a part in a given image (an event that is very unlikely to occur by random chance), it is a strong indication that the identified location is correct. In many embodiments, the confidence estimate is a sequential estimation of risk over a probabilistic model that combines annotator skill, source data difficulty, and an incrementally trained machine classifier.

In practice, multiclass data annotations systems significantly outperform existing techniques for data annotation. In many embodiments, multiclass data annotation systems reduce annotation time by a factor of 4-11 for binary filtering of internet search results, a factor of 2-4 for annotation of boxes of pedestrians in images, while also reducing annotation error. In a variety of embodiments, multiclass data annotation systems require a significant decrease, typically a factor of 2-3, in the average number of annotations per piece of source data to reach the same performance (as measured based on error rate) as majority vote on the same set of source data.

A variety of multiclass data annotation systems and multiclass data annotation processes in accordance with embodiments of the invention are described in more detail below.

Multiclass Data Annotation Systems

Multiclass data annotation systems in accordance with embodiments of the invention can distribute sets of source data to a variety of annotators and, based on the annotations obtained from the annotators, determine labels corresponding to the ground truth of the source data for the source data, calculate annotator performance, and/or train a variety of machine classifiers. A conceptual illustration of a multiclass data annotation system in accordance with an embodiment of the invention is shown in FIG. 1A. The multiclass data annotation system 100 includes data annotation server system 110 connected to source data database 120 and one or more annotator devices 130 via network 140. In many embodiments, the data annotation server system 110 and/or source data database 120 are implemented using a single server. In a variety of embodiments, distributed data annotation server system 110 and/or source data database 120 are implemented using a plurality of servers. In many embodiments, annotation devices 130 are implemented utilizing data annotation server system 110 and/or source data database 120. Network 140 can be one or more of a variety of networks, including, but not limited to, wide-area networks, local area networks, and/or the Internet as appropriate to the requirements of specific applications in accordance with embodiments of the invention.

Data annotation server system 110 can obtain pieces of source data and/or store the pieces of source data using source data database 120. Source data database 120 can obtain source data from any of a variety of sources and any of a variety of providers of source data as appropriate to the requirements of specific applications in accordance with embodiments of the invention. In a variety of embodiments, source data database 120 includes one or more references (such as a uniform resource locator) to source data that is stored in a distributed fashion. In several embodiments, one or more pieces of source data in source data database 120 includes source data metadata having observations describing one or more pieces of the source data. Data annotation server system 110 can distributes subsets of the source data to one or more annotator devices 130 and requests annotations of the source data. Annotator devices 130 generate annotations for one or more features within the source data and transmit annotated source data to distributed data annotation server system 110.

Annotator devices 130 can annotate pieces of source data based on features present in the source data and an annotation task directing annotator devices 130 to identify particular feature(s) within the pieces of source data. Annotator devices 130 include, but are not limited to, human annotators, machine classifiers, and emulations of human annotators performed using machine annotators. Human annotators can constitute any human-generated annotators, including users performing human intelligence tasks via a service such as the Amazon Mechanical Turk service provided by Amazon.com, Inc. of Seattle, Wash. In various embodiments, annotator devices 130 include (but are not limited to) personal computers, tablet computers, mobile phone handsets, software running on data annotation server system 110, and/or any of a variety of devices as appropriate to the requirements of specific applications of embodiments of the invention. In several embodiments, annotator devices 130 provide a user interface and an input device allowing a user to view the pieces of source data and provide annotations (such as identifying features within a piece of source data) for the pieces of source data. In a number of embodiments, previously annotated features within the source data are highlighted and the annotator device 130 is asked to identify any other matching features within the source data and/or correct (or confirm) the existing annotation(s).

Figure 1B:
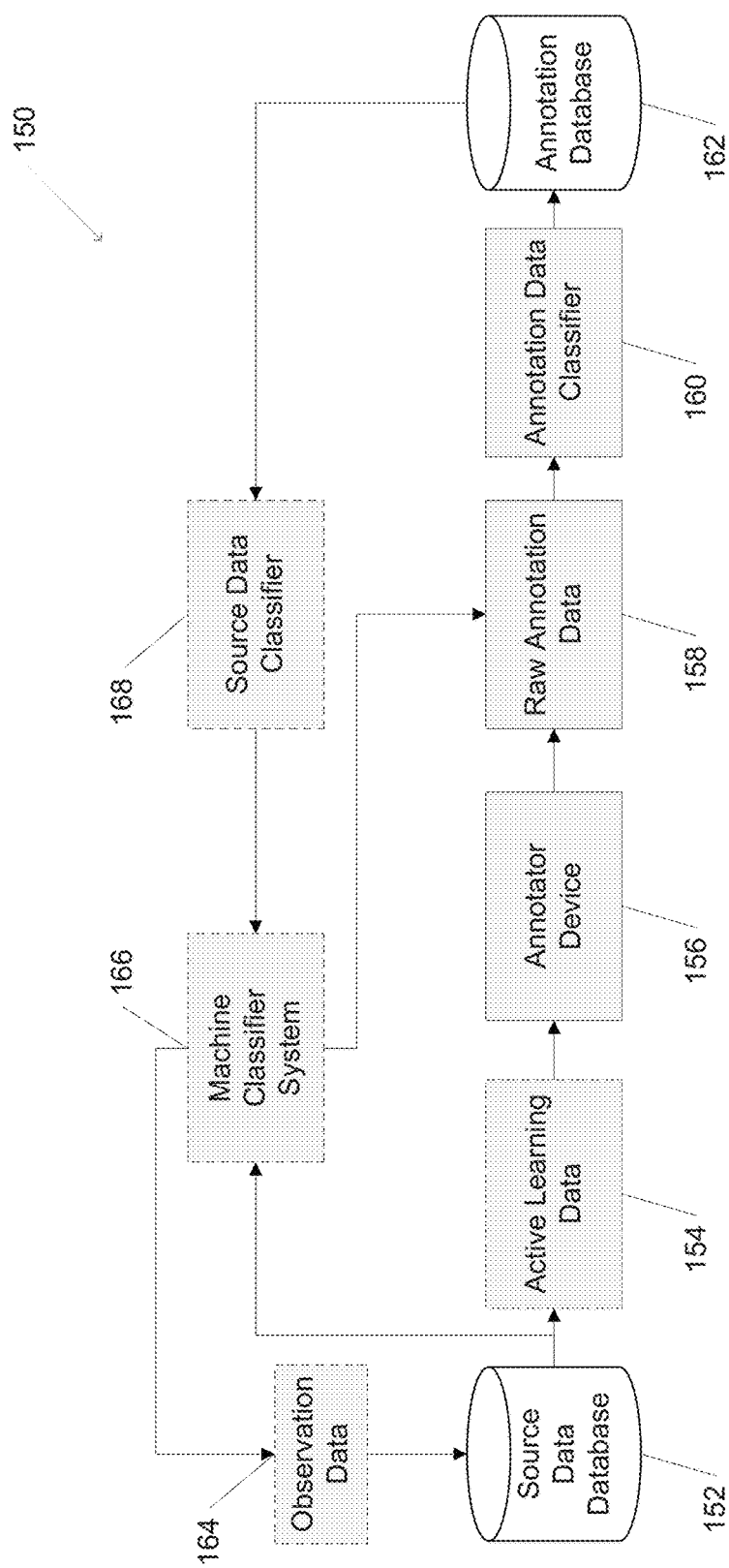
FIG. 1B is a conceptual illustration of a data flow within a multiclass data annotation system in accordance with an embodiment of the invention.

Turning now to FIG. 1B, a conceptual illustration of the data flow within a multiclass data annotation system is shown. Data flow 150 includes a source database 152 that can provide source data to a machine classifier system 166. In many embodiments, the source database 152 receives observation data 164 that describes one or more pieces of the source data. Active learning data 156 can be combined with the source data to direct the annotators in identifying and/or annotating features within the provided source data utilizing any of a variety of multiclass data annotation processes described herein. The annotator devices 156 utilize the source data and/or active learning data to generate a set of raw annotator data 158 which can be combined provided to an annotation data classifier 160. Annotation data classifier 160 performs a variety of multiclass data annotation processes on the source data, active learning data, and/or raw annotation data to generate source data models including a set of labels for one or more pieces of the source data. In a variety of embodiments, the annotated data can be provided to source data classifier 168 to identify a variety of additional characteristics of the source data. In a number of embodiments, the annotated data and/or classified source data can be provided to machine classifier system 166 and utilized to train a variety of machine classifiers. The machine classifier system 166 can also annotate the source data and/or raw annotation data in a variety of embodiments of the invention. The machine classifier system 166 can also be utilized to annotate source data other than the source data that was used to train the machine classifier system 166 as appropriate to the requirements of specific applications of embodiments of the invention.

Multiclass data annotation systems and data flows in accordance with embodiments of the invention are described above with respect to FIGS. 1A-B; however, it should be appreciated that any of a number of variations, such that those that utilize machine classifiers other than those specifically described, can be utilized in accordance with embodiments of the invention. In several embodiments, data annotation server systems, source data databases, and/or annotator devices provide an interface, such as an application programming interface (API) or web service, which provides some or all of the data to third-party systems for further processing. Access to the interface can be open and/or secured using any of a variety of techniques, such as by using client authorization keys, as appropriate to the requirements of specific applications of the invention.

Annotator Devices and Data Classification Server Systems

Figure 2A:
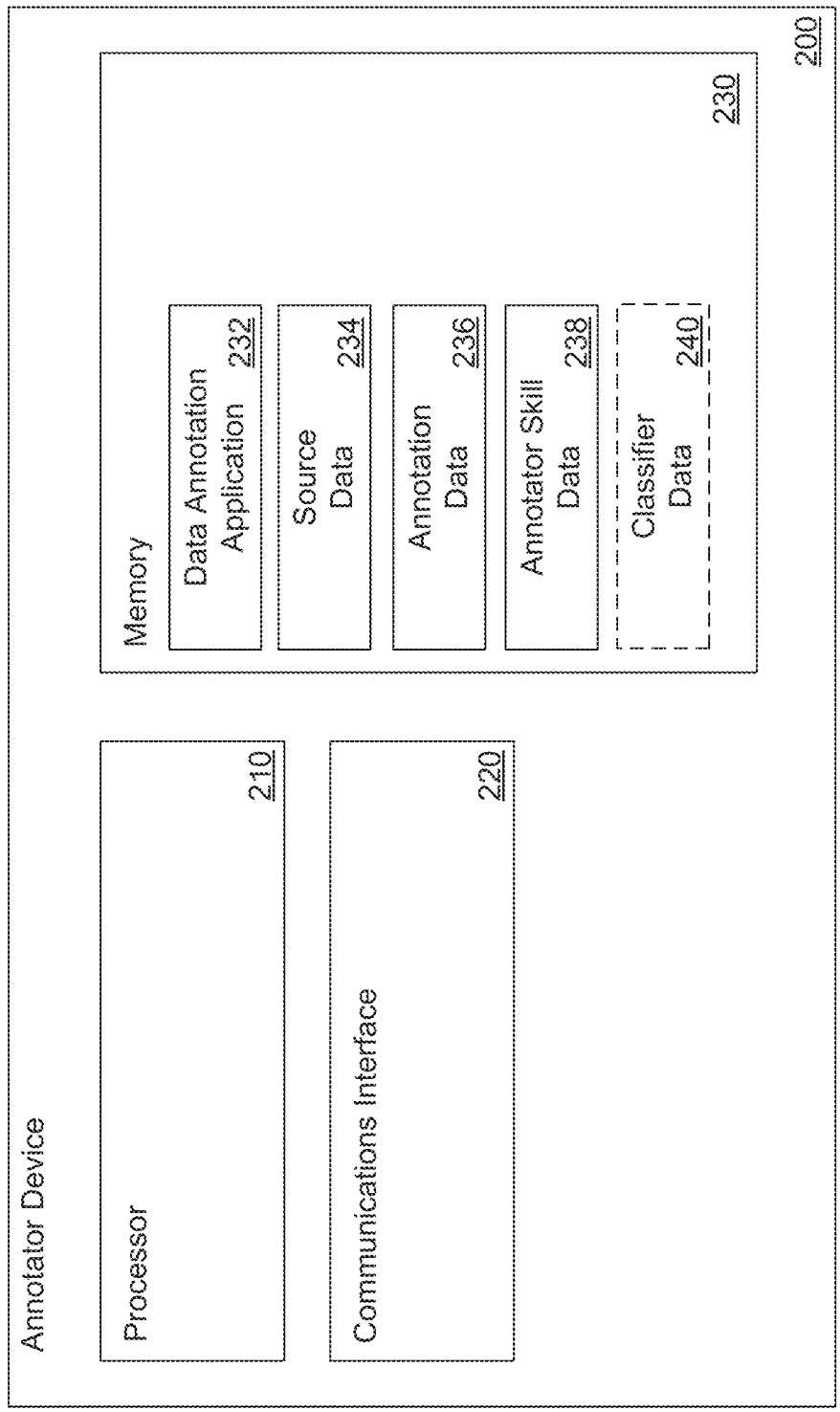
FIG. 2A is a conceptual illustration of an annotator device in accordance with an embodiment of the invention.

Multiclass data annotation systems in accordance with embodiments of the invention include a variety of devices for obtaining and annotating source data. A conceptual illustration of an annotator device in accordance with an embodiment of the invention is shown in FIG. 2A. The annotator device 200 includes a processor 210 in communication with memory 230. The annotator device 200 can also include one or more communication interfaces 220 capable of sending and receiving data. In a number of embodiments, the communication interface 220 is in communication with the processor 210 and/or the memory 230. In several embodiments, the memory 230 is any form of storage storing a variety of data, including, but not limited to, a data annotation application 232, source data 234, annotation data 236, annotator skill data 238, and/or classifier data 240. In many embodiments, data annotation application 232, source data 234, annotation data 236, annotator skill data 238, and/or classifier data 240 are stored using an external server system and received by the annotator device 200 using the communications interface 220.

Figure 2B:
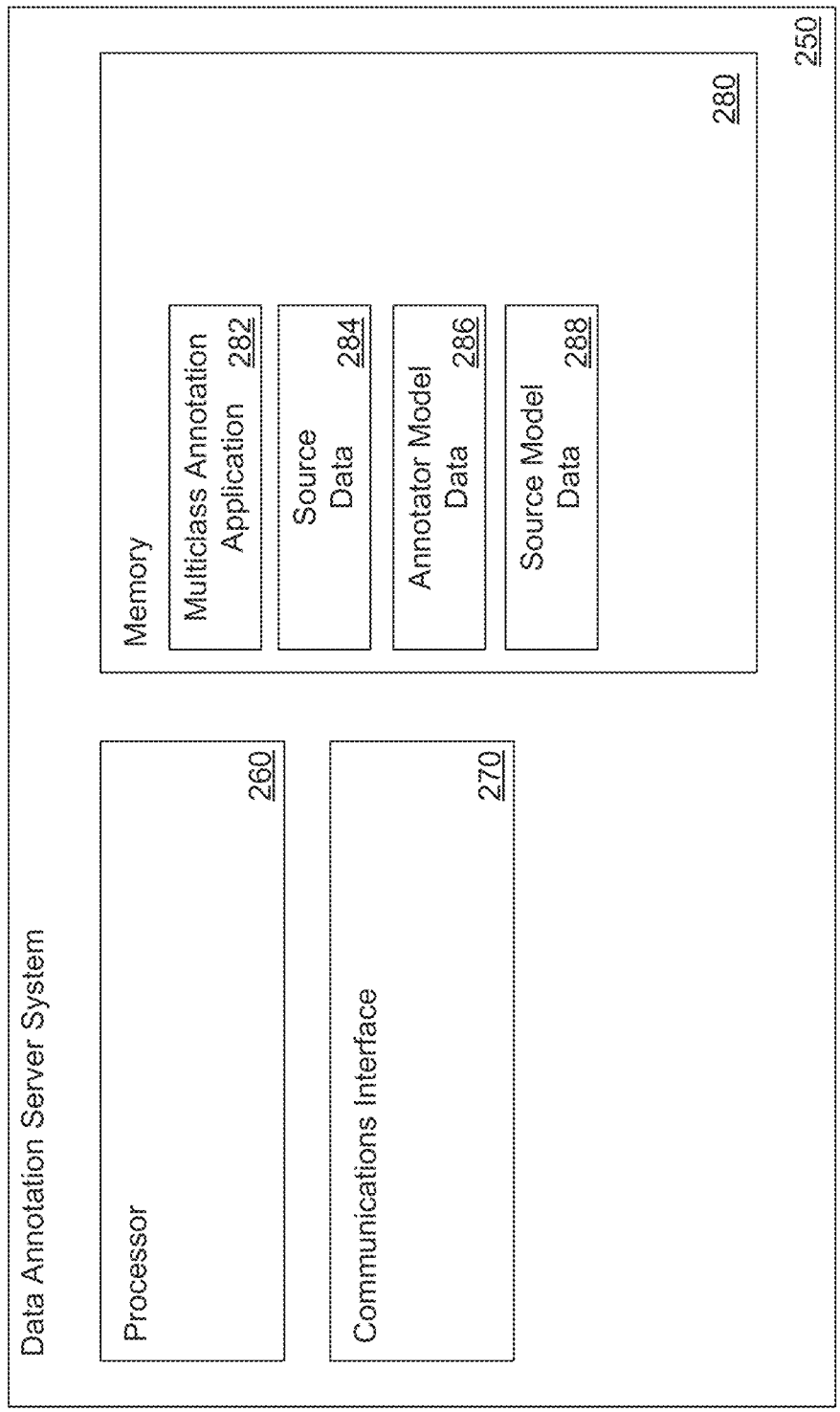
FIG. 2B is a conceptual illustration of a data annotation server system in accordance with an embodiment of the invention.

A conceptual illustration of a data annotation server system in accordance with an embodiment of the invention is shown in FIG. 2B. The data annotation server system 250 includes a processor 260 in communication with memory 280. The data annotation server system 250 can also include one or more communications interfaces 270 capable of sending and receiving data with a variety of devices, such as with source data databases and annotator devices. In a number of embodiments, the communication interface 270 is in communication with the processor 260 and/or the memory 280. In several embodiments, the memory 280 is any form of storage storing a variety of data, including, but not limited to, a multiclass annotation application 282, source data 284, annotator model data 286, and source model data 288. In many embodiments, the multiclass annotation application 282, source data 284, annotator model data 286, and/or source model data 288 are stored using an external server system and received by the data annotation server system 250 using the communications interface 270.

The processor 210 and processor 260 can be directed, by the data annotation application 232 and the multiclass annotation application 282 respectively, to perform a variety of multiclass data annotation processes described herein.

Source data can include any of a variety of data to be annotated including, but not limited to, image data, audio data, signal data, text data, and/or any other data as appropriate to the requirements of specific applications of embodiments of the invention. Annotation data can include raw annotations for one or more pieces of source data. Annotator skill data can describe the characteristics of the annotator device, such as skill data describing the skill of a particular annotator device with a particular classification of source data, confidence data describing confidence in a particular (set of) annotations, along with any other characteristics of the annotator device as appropriate to the requirements of specific applications of embodiments of the invention. Classifier data can include training data and other classification data to allow a machine classifier to determine annotation data and/or confidence metrics related to the annotation data in order to efficiently identify labels for a piece of source data indicating the ground truth of the piece of source data. Annotator model data can describe the confidence associate with annotations provided by an annotator device and/or the performance of the annotator devices on particular pieces and/or classes of source data. Source model data can describe the characteristics of the pieces of source data, including the ground truth of the source data, the difficulty of the source data, crowdsourced label(s) for the source data, and/or the number of annotations associated with the source data. It should be noted that the specific features described by the data described are not strictly required or exhaustive, and that alternative features can be included as appropriate to the requirements of specific applications of embodiments of the invention.

Although specific architectures for annotator devices and data annotation server systems in accordance with embodiments of the invention are conceptually illustrated in FIGS. 2A-B, any of a variety of architectures, including those that store data or applications on disk or some other form of storage and are loaded into memory at runtime, can also be utilized. Additionally, any of the data utilized in the system can be cached and transmitted once a network connection (such as a wireless network connection via the communications interface) becomes available. In a variety of embodiments, a memory includes circuitry such as, but not limited to, memory cells constructed using transistors, that store instructions. Similarly, a processor can include logic gates formed from transistors (or any other device) that dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Multiclass Data Annotation Overview

A variety of multiclass data annotation processes include determining labels for source data based on potentially imperfect annotations provided by a variety of annotators and machine classifiers. Let $X=\{x_i\}_{i=1}^{N}$ be a set of source data to be annotated with unknown true annotations $Y=\{y_i\}_{i=1}^{N}$ using a pool of imperfect crowd annotators. Each $y_i$ can represent a binary class annotation, bounding box, part keypoint location, multiclass annotation, and/or any other type of annotation as appropriate to the requirements of specific applications of embodiments of the invention. For each piece of source data i, an annotation $\bar{y}_i$ can be recovered that is equivalent to $y_i$ with high probability by combining multiple redundant annotations $$Z_i=\{z_{ij}\}_{j=1}^{|W_i|}$$

where each $z_{ij}$ is an imperfect annotator annotation (e.g. a perception of $y_i$), and $W_i$ is that set of annotators that annotated piece of source data i.

The number of annotations $|W_i|$ can vary significantly for different pieces of source data i. This occurs because the confidence of an estimated annotation $\bar{y}_i$ can depend on the number of redundant annotations $|W_i|$ along with the level of agreement between those annotations $Z_i$, the skill level of the particular annotators that annotated i, and the agreement with a machine classifier. In many embodiments, the machine classifier can be incrementally trained using any of a variety of techniques described herein, including with respect to FIG. 8.

At any given time step, let $Z=\{Z\}_{i=1}^{N}$ be the set of annotator annotations for all pieces of source data. The probability over observed pieces of source data, true labels, and annotator annotations can be defined as $$p(Y,Z)=\Pi_i p(y_i)(\Pi_{j\in W_i} p(z_{ij}|y_i))$$

where $p(y_i)$ is a prior probability over possible annotations and $p(z_{ij}|y_i)$ is a model of noisy annotator annotations. In several embodiments, each annotator annotation is independent. The maximum likelihood solution $\bar{Y}=\arg\max p(Y|Z) = \arg\max p(Y, Z)$ can be found for each piece of source data separately:

$$\bar{y}_i=\arg\max_{y_i}(p(y_i)\Pi_{j\in W_i} p(z_{ij}|y_i))$$

The risk $$\mathcal{R}(\bar{y}_i)=\int_{y_i} \ell(y_i,\bar{y}_i)p(y_i|Z_i)$$

associated with the predicted annotation cam be defined as $$\mathcal{R}(\bar{y}_i) = \frac{\int_{y_i} l(y_i, \bar{y}_i) p(y_i) \prod_{j \in W_i} p(z_{ij} | y_i)}{\int_{y_i} p(y_i) \prod_{j \in W_i} p(z_{ij} | y_i)}$$

where $\ell(y_i, \bar{y}_i)$ is the loss associated with the predicted annotation $\bar{y}_i$ when the true annotation is $y_i$.

In a variety of embodiments, the risk associated with a predicted annotation can be utilized to calculate the confidence in the predicted annotation using any of a variety of techniques, including by calculating probability estimations and by calculating an inverse relationship between risk and confidence. A logical criterion is to accept $\bar{y}_i$ once the risk drops below a certain threshold $\mathcal{R}(\bar{y}_i) \leq \tau_\in$, with $\tau_\in$ being the minimum tolerable error per piece of source data. A general online crowdsourcing process 300, shown in FIG. 3, can process source data. In many embodiments, the source data is processed in batches. Priority can be given to annotating unfinished pieces of source data with the fewest number of annotations $|W_i|$; however, any priority to annotating pieces of source data can be utilized as appropriate to the requirements of specific applications of embodiments of the invention. Each time a new set of source data is received, combined annotations $\bar{y}_i$ can be re-estimated, and the risk criterion can be used to determine whether or not a piece of source data is finished (e.g. when a label correctly identifying the piece of source data has been determined) or may require more annotations.

Risk can be calculated by using the actual contents $x_i$ of each piece of source data as an additional source of information. For example, if image data is being annotated, specific pixel locations where the annotations have been placed can be compared. In a variety of embodiments, the distance between pixels in image data is used to compare the locations within the image data. Any specific feature of a piece of source data can be utilized to compare the annotations between pieces of source data as appropriate to the requirements of specific applications of embodiments of the invention. A number of multiclass data annotation processes can be utilized to make this comparison, including a naive process that treats machine classification in the same way as a human annotator by appending the machine classifier prediction $z_{i,cv}$ to the set of annotator annotations $W_i$ and a smarter process that exploits the fact that machine classification can provide additional information than a single annotation output, such as confidence estimates that a bounding box occurs at each pixel location in a piece of source data. For the smarter process, the joint probability over observed pieces of source data, true annotations, and annotator annotations is:

$$p(Y, Z, \theta | X) = p(\theta) \prod_i \left( p(y_i | x_i, \theta) \prod_{j \in W_i} p(z_{ij} | y_i) \right)$$

where $p(y_i | x_i, \theta)$ is the estimate of a machine classification with parameters $\theta$.

Annotator model data can model the fact that some annotators are more skillful or careful than others and some source data is more difficult or ambiguous than others. Let $W = \{w_j\}_{j=1}^M$ be parameters encoding the skill level a set of M annotators, and let $D = \{d_i\}_{i=1}^n$ be parameters encoding the level of inherent difficulty of annotating each piece of source data i. Then the joint probability is $$p(Y, Z, W, D, \theta | X) = p(\theta) \prod_i (p(d_i) p(y_i | x_i, \theta)) \prod_j p(w_j) \prod_{i,j \in W_i} p(z_{ij} | y_i, d_i, w_j)$$

where $p(d_i)$ is a prior on the source data difficulty, $p(w_j)$ is a prior on an annotator's skill level, and $p(z_{ij} | y_i, d_i, w_j)$ models noisy annotator responses as a function of the ground truth annotation, source data difficulty and annotator skill parameters.

The maximum likelihood solution can be expressed as:

$$\bar{Y}, \bar{W}, \bar{D}, \bar{\theta} = \arg\max Y, W, D, \theta P(Y, W, D, \theta | X, Z)$$

In many embodiments, parameters are estimated using alternating maximization algorithms optimize with respect to the parameters of one piece of source data or annotator at a time:

$$\bar{y}_i = \arg\max_{y_i} p(y_i | x_i, \bar{\theta}) \prod_{j \in W_i} p(z_{ij} | y_i, d_i, w_j)$$

$$\bar{d}_i = \arg\max_{d_i} p(d_i) \prod_{j \in W_i} p(z_{ij} | y_i, d_i, w_j)$$

$$\bar{w}_j = \arg\max_{w_j} p(w_j) \prod_{i \in I_j} p(z_{ij} | \bar{y}_i, \bar{d}_i, w_j)$$

$$\bar{\theta} = \arg\max_{\theta} p(\theta) \prod_i p(\bar{y}_i | x_i, \theta)$$

where $\mathcal{L}_j$ is the set of source data annotated by annotator j.

Exact computation of the risk $\mathcal{R}_i = \mathcal{R}(\bar{y}_i)$ can be difficult because annotations for different pieces of source data can be correlated through W and θ. An approximation of the risk can include assuming the approximations $\bar{W}$, $\bar{I}$, and $\bar{\theta}$ a such that $$\mathcal{R}(\bar{y}_i) \approx \int_{y_i} l(y_i, \bar{y}_i) p(y_i | X, Z, \bar{\theta}, \bar{W}, \bar{D})$$

$$\mathcal{R}(\bar{y}_i) \approx \frac{\int_{y_i} l(y_i, \bar{y}_i) p(y_i | x_i, \bar{\theta}) \prod_{j \in W_i} p(z_{ij} | y_i, \bar{d}_i, \bar{w}_j)}{\int_{y_i} p(y_i | x_i, \bar{\theta}) \prod_{j \in W_i} p(z_{ij} | y_i, \bar{d}_i, \bar{w}_j)}$$

and can be solved separately for each piece of source data i.

Incorporating priors can be important to improve the robustness of multiclass data annotation processes. In a number of embodiments, early batches of source data contain relatively few annotations for a number of pieces of source data $|\mathcal{L}_j|$, making annotator skill $w_j$ difficult to model. Additionally, in practice many pieces of source data will satisfy the minimum risk criterion with two or less annotations $|W_i| \leq 2$, making source data difficulty $d_i$ difficult to estimate. In several embodiments, a tiered prior system can be utilized. A dataset-wide annotator skill prior $p(w_j)$ and source data difficulty prior $p(d_i)$ (treating all annotators and source data the same) can be estimated and used to model per annotator and per source data parameters when the number of annotations is small. As a heuristic to avoid over-estimating skills, the consideration of pieces of source data can be limited to those with at least 2 annotator annotations$|W_i|>1$ when learning annotator skills, source data difficulties, and their priors, since agreement between annotator annotations can be the only viable signal for estimating annotator skill. In a number of embodiments, a prior that regularizes the learned dataset-wide priors can also be utilized Process 300, shown in FIG. 3, provides pseudo-code to implement a multiclass data annotation process for online crowdsourcing for any type of annotation in accordance with an embodiment of the invention. However, it should be noted that any of variety of processes, including those that define how to represent true annotations $y_i$ and annotator annotations $z_{ij}$, and implementing solvers for inferring true annotations $\bar{y}_i$, source data difficulties $\bar{d}_i$, annotator skills $\bar{w}_j$, machine classifier parameters $\bar{\theta}$, and/or risk $\mathcal{R}_i$ associated with the predicted true label, can be utilized as appropriate to the requirements of specific applications of embodiments of the invention.

A variety of multiclass data annotation processes that can be performed in accordance with embodiments of the invention are described in more detail below.

Annotating with Binary Annotations

A number of multiclass data annotation processes include generating binary annotations for pieces of source data with each annotation $y_i \in {0,1}$ denotes the absence/presence of a class of interest. Annotator skill $w_j=[p_j^1, p_j^0]$ can be modeled using two parameters representing the annotator's skill at identifying true positives and true negatives, respectively. In a variety of embodiments, $z_{ij}$ given $y_i$ has a Bernoulli distribution, such that $$p(z_{ij}|y_i=1)=p_j^1$$

and $$p(z_{ij}|y_i=0)=p_j^0$$

However, any probability distribution can be utilized as appropriate to the requirements of specific applications of embodiments of the invention.

As described above, a tiered set of priors can be utilized to make the system robust in corner cases where there are few annotators or pieces of source data. Ignoring annotator identity and assuming an annotator annotation z given y has a Bernoulli distribution such that $$p(z|y=1)=p^1$$

and $$p(z|y=0)=p^0$$

Beta priors $$\text{Beta}(n_\beta p^0, n_\beta(1-p^0))$$

and $$\text{Beta}(n_\beta p^1, n_\beta(1-p^1))$$

can be added on $p_j^0$ and $p_j^1$, where $n_\beta$ is the strength of the prior. An intuition of this is that annotator j's own annotations $z_{ij}$ start to dominate estimation of $w_j$ once the annotator has annotated more than $n_\beta$ pieces of source data, otherwise the dataset-wide priors dominate. Beta priors $$\text{Beta}(n_\beta p, n_\beta(1-p))$$

can also be placed on $p^0$ and $p^1$ to handle cases such as the first couple batches of source data where the number of annotations can be low. In several embodiments, $p=0.8$ can be utilized as a prior on binary variables and $n_\beta=5$, although any values can be utilized as appropriate to the requirements of specific applications of embodiments of the invention. An estimation of annotator skill priors $p(w_j)$ can be calculated by counting the number of annotations agreeing with combined predictions:

$$p^k = \frac{n_\beta p + \sum_{ij} 1[z_{ij} = \bar{y}_i = k, |W_i| > 1]}{n_\beta + \sum_{ij} 1[\bar{y}_i = k, |W_i| > 1]}, k = 0, 1$$

where $1[\cdot]$ is the indicator function.

Analogously, annotator skills $w_1$ can be calculated by counting annotator j's annotations that agree with combined predictions:

$$p_j^k = \frac{n_\beta p^k + \sum_{i \in I_j} 1[z_{ij} = \bar{y}_i = k, |W_i| > 1]}{n_\beta + \sum_{i \in I_j} 1[\bar{y}_i = k, |W_i| > 1]}, k = 0, 1$$

In several embodiments, a linear SVM is used as a machine classifier on features from a general purpose pretrained CNN feature extractor, followed by probability calibration using Platt scaling. This results in probability estimates $$p(y_i|x_i,\theta) = \sigma(\gamma \theta \cdot \phi(x_i))$$

for each piece of source data i, where $\phi(x_i)$ is a CNN feature vector, $\theta$ is a learned SVM weight vector, $\gamma$ is probability calibration scalar from Platt scaling, and $\sigma()$ is the sigmoid function. However, it should be noted that any of a variety of machine classifiers can be utilized in accordance with embodiments of the invention as described in more detail with respect to FIG. 8.

Figure 4:
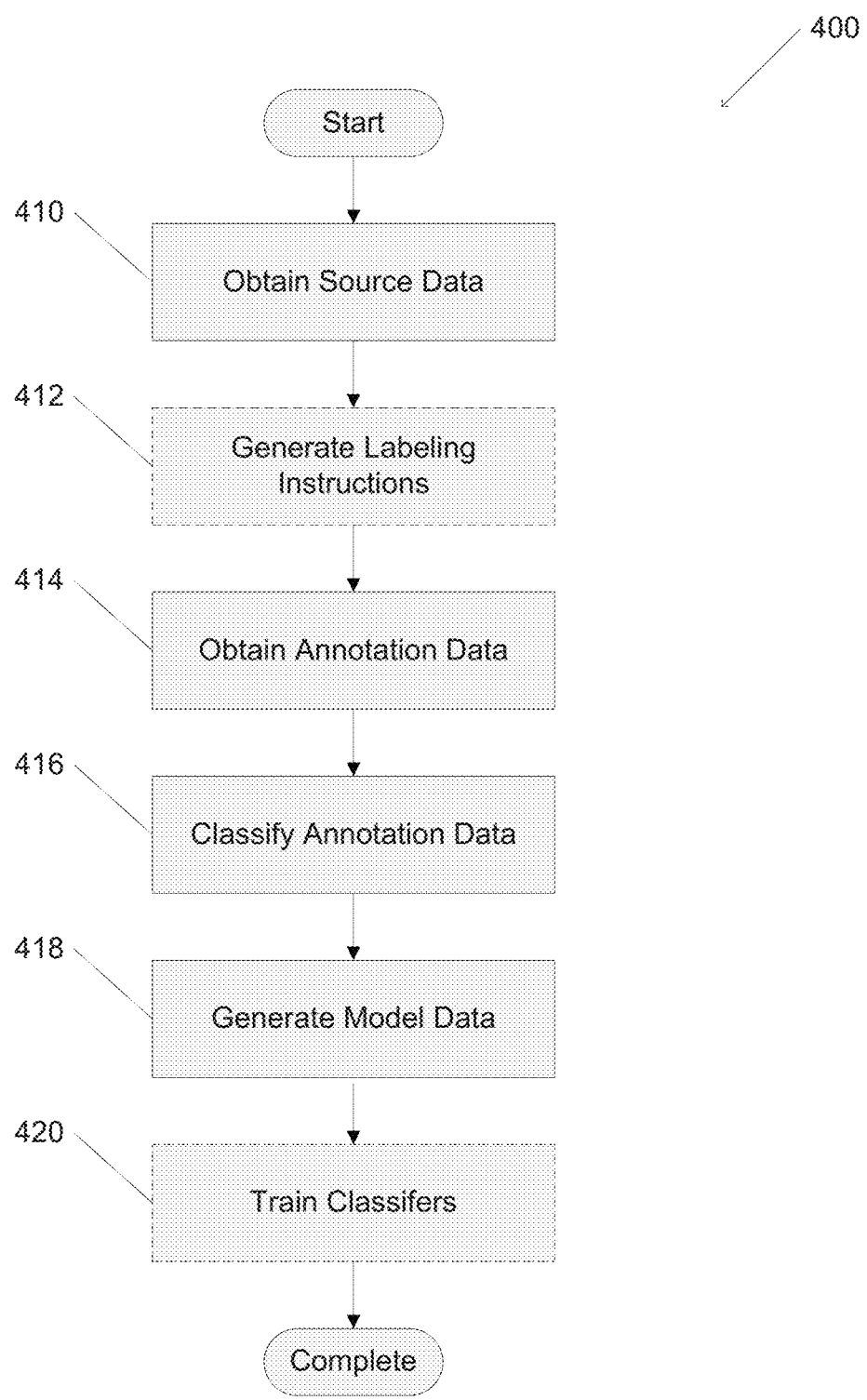
FIG. 4 is a flow chart conceptually illustrating a process for annotating data with binary annotations in accordance with an embodiment of the invention.

Turning now to FIG. 4, a process for the binary annotation of source data in accordance with an embodiment of the invention is shown. The process 400 includes obtaining (410) source data and, in a variety of embodiments, labeling instructions are generated (412). Annotation data can be obtained (414) and classified (416). Annotator model data and/or source model data can be generated (418) and, in many embodiments, one or more machine classifiers are trained (420).

Specific processes for the binary annotation of source data in accordance with embodiments of the invention are described with respect to FIG. 4; however, any of variety of processes, including those that utilize alternative criteria for determining the confidence in particular annotations, can be utilized as appropriate to the requirements of specific applications of embodiments of the invention.

Annotating with Part Keypoint Annotations

Part keypoint annotations are popular in a variety of applications, such as computer vision. Multiclass data annotation processes include obtaining part keypoint annotations identifying an annotation of a particular part (e.g. feature) and its location within one or more pieces of source data. In many embodiments, each part can be represented as a location l and binary visibility variable v, such that $y_i=(l_i,v_i)$. In several embodiments, the location is expressed as a x,y pixel within a piece of image data. In a variety of embodiments, v is modeled using a model as for binary classification. In several embodiments, l is a continuous variable. In a number of embodiments, even though most datasets contain several semantic parts of an object, each part is modeled and annotated independently, thereby simplifying notation and collection.

Source data difficulty can be modeled. Let $l_i$ be the true location of a keypoint in piece of source data i, while $l_{ij}$ is the location of the annotation provided by annotator j. In many embodiments, $l_{ij}$ is Gaussian distributed around $l_i$ with variance $\sigma_{ij}^2$. This variance is governed by the annotator's skill or source data difficulty $$\sigma_{ij}^2 = e_{ij}\sigma_j^2 + (1-e_{ij})\sigma_i^2$$

where $\sigma_j^2$ represents annotator noise (that is, some annotators are more precise than others) and $\sigma_i^2$ represents per source data noise (e.g., the precise location of a particular feature in a given piece of source data can be ambiguous), and $e_{ij}$ is a binary variable that determines if the variance will be governed by annotator skill and/or source data difficulty.

Annotator j sometimes makes a mistake (intentional or not) and indicates the location of an annotation somewhere very far from the Gaussian center of the part being annotated. $m_{ij}$ indicates whether or not annotator j made a mistake with probability $p(m_j)$, in which case $l_{ij}$ is uniformly distributed in the piece of source data. Thus:

$$p(l_{ij} | y_i, d_i, w_j) = \sum_{m_{ij} \in 0,1} p(m_{ij} | p_j^m) p(l_{ij} | l_i, m_{ij}, \sigma_{ij})$$

$$p(m_{ij} | p_j^m) = m_{ij} p_j^m + (1-m_{ij})(1-p_j^m)$$

$$p(l_{ij} | l_i, m_{ij}, \sigma_{ij}) = \frac{e_{ij}}{|x_i|} + (1-e_{ij})g(\|l_{ij}-l_i\|^2; \sigma_{ij}^2)$$

where $|x_i|$ is the number of pixel locations in i, and $g(x^2; \sigma^2)$ is the probability density function for the normal distribution.

With annotator skill parameters $$w_j = [\sigma_j, p_j^m, p_j^1]$$

and source data difficulty parameter $d_i = \sigma_i$, a dataset-wide Beta prior $$\text{Beta}(n_\beta p^m, n_\beta(1-p^m))$$

can be placed on $p_j^m$, where $p^m$ is an annotator agnostic probability of making a mistake, and an additional Beta prior $$\text{Beta}(n_\beta p, n_\beta(1-p))$$

can be placed on $p^m$. Similarly, scaled inverse chi-squared priors can be placed on $\sigma_1^2$ and $\sigma_i^2$ such that $$\sigma_j^2 \sim \text{scale-inv-}\chi^2(n_\beta, \sigma^2)$$

and $$\sigma_i^2 \sim \text{scale-inv-}\chi^2(n_\beta, \sigma^2)$$

where $\sigma^2$ is a dataset-wide variance in annotation location.

A variety of annotator and source data parameters can be inferred. Given the priors, simple analytical solutions for inferring the maximum likelihood source data difficulties and annotator skills can be performed when $m_{ij}$, $e_{ij}$, and $\theta$ are known. In a variety of embodiments, latent variables $m_{ij}$ and $e_{ij}$ are modeled using expectation maximization with the maximization step over all annotator and source data parameters, such that annotator skill parameters are estimated as $$\sigma_i^2 = \frac{n_\beta \sigma^2 + \sum_{j \in W_i}(1-\mathbb{E}e_{ij})(1-\mathbb{E}m_{ij})\|l_{ij}-l_i\|^2}{n_\beta + 2 + \sum_{j \in W_i}(1-\mathbb{E}e_{ij})(1-\mathbb{E}m_{ij})}$$

$$\sigma_j^2 = \frac{n_\beta \sigma^2 + \sum_{i \in I_j}\mathbb{E}e_{ij}(1-\mathbb{E}m_{ij})\|l_{ij}-l_i\|^2}{n + 2 + \sum_{i \in I_j}\mathbb{E}e_{ij}(1-\mathbb{E}m_{ij})}$$

$$p_j^m = \frac{n_\beta p^m + \sum_{i \in I_j}\mathbb{E}m_{ij}}{n_\beta + |I_j|}$$

In a variety of embodiments, $\mathbb{E}\, m_{ij}$ and/or $\mathbb{E}\, e_{ij}$ can be used as a weight and/or $n_\beta$ synthetic examples can be added from the global prior distribution. Expectations are then:

$$\mathbb{E}e_{ij} = \frac{g_j}{g_i + g_j}, \quad \mathbb{E}m_{ij} = \frac{1/|x_i|}{1/|x_i| + (1+\mathbb{E}e_{ij})g_i + \mathbb{E}e_{ij}g_j}$$

$$g_i = g(\|l_{ij}-l_i\|^2; \sigma_i^2), \quad g_j = g(\|l_{ij}-l_i\|^2; \sigma_j^2)$$

Maximization and expectation steps can be alternated, with an initial value of $\mathbb{E}\, m_{ij}=0$ (e.g. assuming an annotator didn't make a mistake) and $\mathbb{E}\, e_{ij}=0.5$ (e.g. assuming annotator noise and source data difficulty have equal contribution), although any initial values can be utilized as appropriate to the requirements of specific applications of embodiments of the invention.

With this information, true part keypoint annotations can be generated. Inferring $\bar{y}_i$ can be done in a brute-force way due to the presence of the machine classifier term $p(y_i|x_i, \theta)$. Let $\mathbb{X}_i$ be a vector of length $|x_i|$ that stores a probabilistic part detection map. In a variety of embodiments, the part detection map stores the value of $p(y_i|x_i, \theta)$ for each possible value of $y_i$. Let $\mathbb{Z}_{ij}$ be a corresponding vector of length $|x_i|$ that stores the value of $p(z_{ij}|y_i, d_i, w_j)$ at each annotation location. Then the vector $$\mathbb{Y}_i = \mathbb{X}_i \Pi_{j \in W_i} \mathbb{Z}_{ij}$$

stores the likelihood of all possible values of $y_i$, where products can be computed using component-wise multiplication. The maximum likelihood annotation $\bar{y}_i$ can be calculated based on the argmax of $\mathbb{Y}_i$.

Risk can also be calculated for the annotations. Let $\mathbb{L}_i$ be a vector of length $|x_i|$ that stores the loss $\ell(y_i, \bar{y}_i)$ for each possible value of $y_i$. In a number of embodiments, a part prediction is incorrect if its distance from ground truth is greater than a threshold value. In several embodiments, the threshold value is calculated based on the standard deviation of annotator responses on a per part basis, such as 2 standard deviations. The risk associated with predicted annotation $\bar{y}_i$ is then $$\mathcal{R}_i = \mathbb{L}_i^T \mathbb{Y}_i / \|\mathbb{Y}_i\|_1$$

Figure 5:
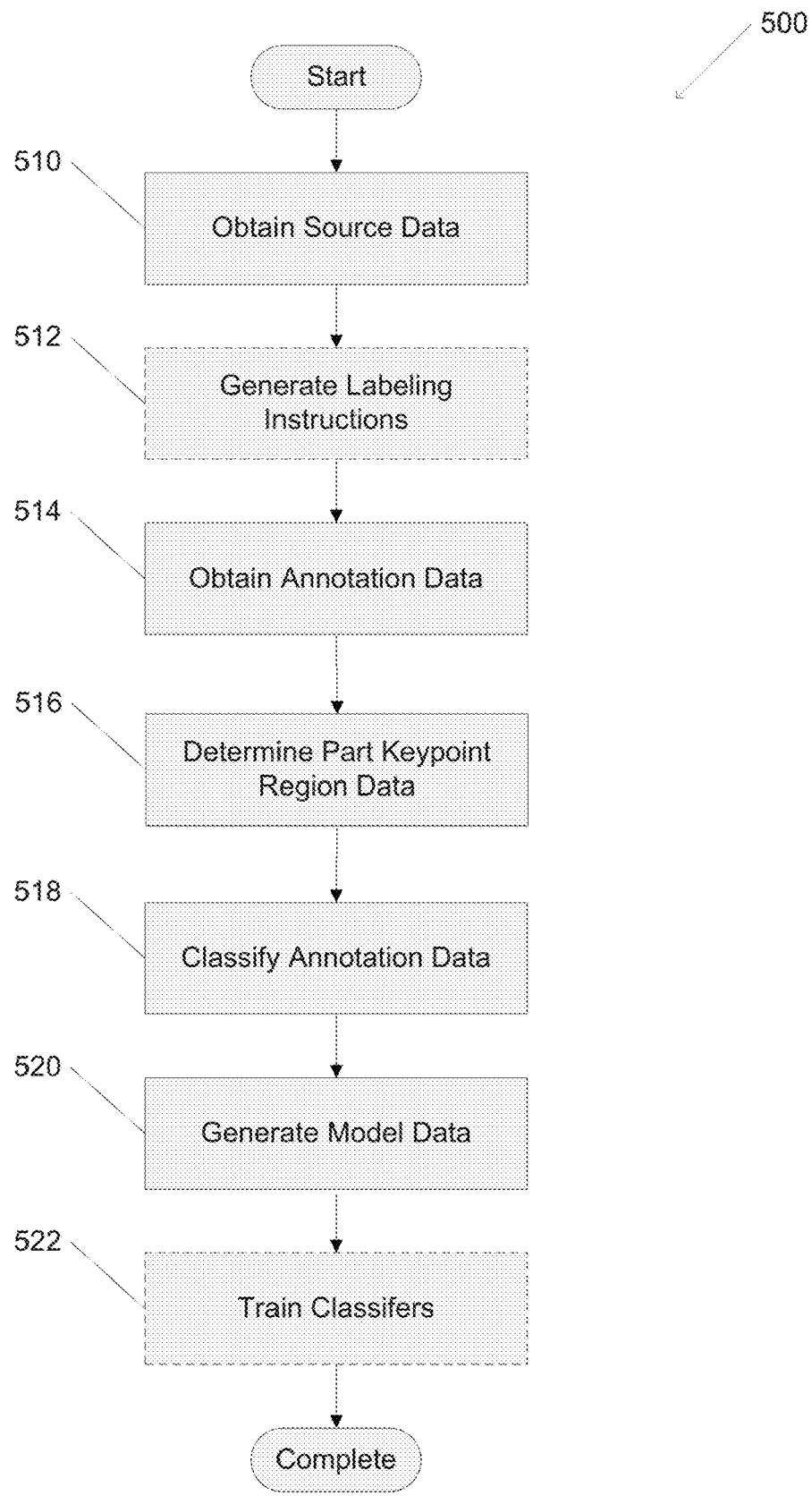
FIG. 5 is a flow chart conceptually illustrating a process for annotating data with part keypoint annotations in accordance with an embodiment of the invention.

Turning now to FIG. 5, a process for part keypoint annotation of source data in accordance with an embodiment of the invention is shown. The process 500 includes obtaining (510) source data and, in a variety of embodiments, labeling instructions are generated (512). Annotation data can be obtained (514), part keypoint region data can be determined (516), and annotation data can be classified (518). Annotator model data and/or source model data can be generated (520) and, in many embodiments, one or more machine classifiers are trained (522).

Specific processes for part keypoint annotation of source data in accordance with embodiments of the invention are described with respect to FIG. 5; however, any of variety of processes, including those that utilize alternative criteria or statistical models for determining the confidence in particular annotations, can be utilized as appropriate to the requirements of specific applications of embodiments of the invention.

Annotating with Bounding Boxes

Multiclass data annotation processes include annotating multiple objects within a piece of source data using bounding boxes. When utilizing bounding boxes, a variety of difficulties can arise, such as each annotator may annotate a different number of bounding boxes and can annotate objects in a different order. In many embodiments, checking for finished annotations means ensuring that not only that the boundaries of each box is accurate, but also that there are no false negatives or false positives.

Annotator skill and source data difficulty models can be calculated for bounding box annotations. A source data annotation $$y_i = \{b_i^r\}_{r=1}^{|B_i|}$$

can include of a set of objects in the source data where box $b_i^r$ is composed of x, y, $x_2$, $y_2$ coordinates. Annotator j's corresponding annotation $$z_{ij} = \{b_{ij}^k\}_{k=1}^{|B_{ij}|}$$

can include a potentially different number $|B_{ij}|$ of box locations with different ordering. By predicting latent assignments $$\{a_{ij}^k\}_{k=1}^{|B_{ij}|}$$

where $b_{ij}^k$ is annotator j's perception of true box $b_i^{a_{ij}^k}$, the annotation of a matched bounding box is similar to part keypoint annotation with 2D vectors 1 replaced by 4D vectors b.

The difficulty of source data i can be represented by a set of bounding box difficulties $$d_i = \{\sigma_i^r\}_{r=1}^{|B_s|}$$

that measure to what extent the boundaries of each object in the source data are inherently ambiguous. An annotator's skill $$w_j = \{p_j^{fp}, p_j^{fn}, \sigma_j\}$$

encodes the probability $p_j^{fp}$ that an annotated box $B_i^k$ is a false positive (e.g. $a_{ij}^k = \emptyset$), the probability $p_j^{fn}$ that a ground truth box $B_i^r$ is a false negative (e.g. $\forall_k, a_{ij}^k \neq r$), and the annotator's variance $\sigma_j^2$ in annotating the exact boundary of a box is modeled as described above. The number of true positives $n_{tp}$, false positives $n_{fp}$, and false negatives be $n_{fn}$ can be written as $$n_{tp} = \Sigma_{k=1}^{|B_{ij}|} 1[a_{ij}^k \neq \emptyset]$$

$$n_{fn} = |B_i| - n_{tp}$$

$$n_{fp} = |B_{ij}| - n_{tp}$$

with annotation probabilities $$p(z_{ij} | y_i, d_i, w_j) =$$

-continued $$\prod_{k=1...B_{ij}, a_{ij}^k \neq \emptyset} g\left(\left|b_i^{a_{ij}^k} - b_{ij}^k\right|^2; \sigma_{ij}^{k^2}\right)(p_j^{fn})^{n_{fn}}(1-p_j^{fn})^{n_{tp}}(p_j^{fp})^{n_{fp}}(1-p_j^{fp})^{n_{tp}}$$

Dataset-wide priors on all annotator and source data parameters can be placed as described above as appropriate to the requirements of specific applications of embodiments of the invention.

A machine classifier can be trained to classify possible object detections and associated detection scores $$\{(b_{i,cv}^k, m_{i,cv}^k)\}_{k=1}^{|B_{i,cv}|}$$

In many embodiments, a machine classifier is modeled like an annotator with learned parameters $$[p_{cv}^{fp}, p_{cv}^{fn}, \sigma_{cv}]$$

In a variety of embodiments, the false positive parameter $p_{cv}^{fp}$ is replaced with a per bounding box prediction of the probability of correctness as a function of its detection score $m_{i,cv}^k$. The shortlist of detections can be matched to boxes in the predicted annotation $$\bar{y}_i = \{b_i^r\}_{r=1}^{|B_i|}$$

Let $r_{i,cv}^k$ be 1 or −1 if detected box $b_{i,cv}^k$ was matched or unmatched to a box in $\bar{y}_i$. Detection scores can converted to probabilities using Platt scaling and the validation sets described above, although any scaling and validation techniques can be utilized as appropriate to the requirements of specific applications of embodiments of the invention.

True annotations and assignments can be inferred using an approximate algorithm to solve for the maximize likelihood annotation $\bar{y}_i$ concurrently with solving for the best assignment variables $a_{ij}^k$ between annotator and ground truth bounding boxes:

$$\bar{y}_i, a_i = \arg\max_{y_i, a_i} \log \sum_{j \in W_i} \log p(z_{ij} | y_i, d_i, w_j)$$

where $p(z_{ij}|y_i, d_i, w_j)$ can be defined as above. In a variety of embodiments, the problem can be formulated as a facility location problem, a type of clustering problem where the objective is to choose a set of "facilities" to open up given that each "city" must be connected to a single facility. Custom costs can be assigned for opening each facility and connecting a given city to a given facility. Greedy algorithms are known to have good approximation guarantees for some facility location problems, although any technique can be utilized to calculate costs as appropriate to the requirements of specific applications of embodiments of the invention. In a variety of embodiments, facilities will be boxes selected to add to the predicted combined annotation $\bar{y}_i$ and city-facility costs will be costs associated with assigning an annotator box to an opened box. Facility open costs can be calculated as $$C^{open}(b_{ij}^k) = \Sigma_{j \in W_i} -\log p_j^{fn}$$

and city-facility costs can be calculated as $$C^{match}(b_{ij}^k, b_{ij'}^{k'}) = -\log(1-p_j^{fn}) + \log p_j^{fn} - \log(1-p_j^{fp}) - \log g(\|b_{ij}^k - b_{ij'}^{k'}\|^2; \sigma_j^2)$$

for matching annotator box $b_{ij}^k$ to facility $b_{ij'}^{k'}$, while not allowing connections where j=j' unless=k',j=j'. In several embodiments, a dummy facility with open cost 0 is added such that cities matched to it correspond to annotator boxes that are false positives:

$$C_{match}(b_{ij}^k, \text{dummy}) = -\log p_j^{fp}$$

When calculating risk and confidence for bounding box annotations, the loss $\ell(\bar{y}_i, y_i)$ can be defined as the number of false positive bounding boxes plus the number of false negatives, where bounding boxes match if their area of intersection over union is at least 50%. However, any matching area can be utilized as appropriate to the requirements of specific applications of embodiments of the invention. In several embodiments, inferred assignments $a_{ij}^k$ between annotator boxes and true boxes are valid. In this case, the risk $\mathcal{R}_i$ is the expected number of false positives computed by summing over each $b_i^r$ and computing the probability that it is a false positive as above, the expected number of true positives that were too inaccurate to meet the area of intersection over union criterion, and the expected number of false negatives in portions of the source data that don't overlap with any true bounding box $b_i^r$.

Figure 6:
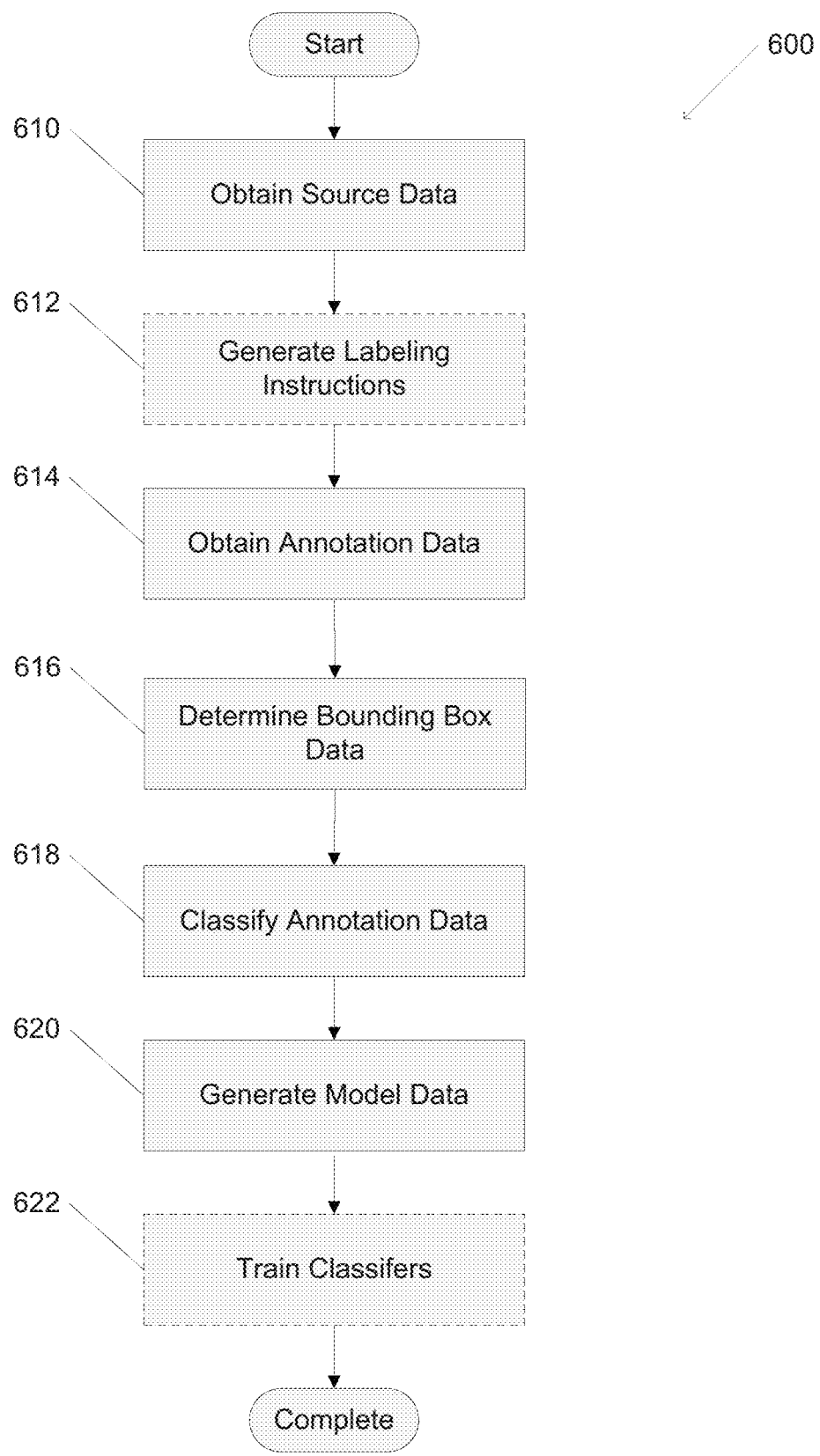
FIG. 6 is a flow chart conceptually illustrating a process for annotating data with bounding box annotations in accordance with an embodiment of the invention.

Turning now to FIG. 6, a process for the annotation of source data using bounding boxes in accordance with an embodiment of the invention is shown. The process 600 includes obtaining (610) source data and, in a variety of embodiments, labeling instructions are generated (612). Annotation data can be obtained (614), bounding box data can be determined (616), and annotation data can be classified (618). Annotator model data and/or source model data can be generated (620) and, in many embodiments, one or more machine classifiers are trained (622).

Specific processes for the annotation of source data using bounding boxes in accordance with embodiments of the invention are described with respect to FIG. 6; however, any of variety of processes, including those that utilize alternative criteria or statistical models for determining the confidence in particular bounding boxes and those that utilize alternative clustering techniques, can be utilized as appropriate to the requirements of specific applications of embodiments of the invention.

Annotating with Multiclass Annotations

Many sets of source data can be organized using a taxonomy having a set of categories and a set of relationships between categories and pieces of source data. Multiclass data annotation processes in accordance with embodiments of the invention can include annotating and modeling the categories and source data, including when multiple categories are associated with a particular piece of source data.

To annotate a set of annotator annotations Z for a set of source data X, a framework jointly models annotator skill W, source data difficulty D, ground truth annotations Y, and computer vision system parameters θ. In many embodiments, a probabilistic framework is utilized. A tiered prior system can be used to regularize the difficulty described in annotator model and source data model priors. Alternating maximization is used for parameter estimation. The risk w($\bar{y}_i$) can be computed for each predicted annotation, providing a stopping criteria for the annotation of a piece of source data. In many embodiments, a piece of source data is annotated when the risk is below a threshold value. Multiple models of annotator skill for the task of multiclass annotation can be utilized for independent and dependent annotator annotations as appropriate to the requirements of specific applications of embodiments of the invention.

In several embodiments, calculating annotator models are calculated when the annotations are independent from each other. Let $x_i$ be the ith piece of source data that contains an object with class annotation $y_i \in (1, \ldots C)$. A set of annotators $W_i$ independently specify a raw annotation of the class of source data i, such that for each $j \in W_i$, $z_{ij}$ is annotator j's guess at $y_i$. In many embodiments, the annotators are not provided with observations or annotations for the source data. Let $w_j$ be a set of parameters encoding annotator j's skill at predicting classes. In this notation, if the class $y_i$ is unknown, the probability of each possible class can be estimated given the set $Z_i = \{z_{ij}\}_{j \in W_i}$ of annotator guesses:

$$p(y_i | Z_i) = \frac{p(y_i) \prod_{j \in W_i} p(z_{ij} | y_i, w_j)}{\sum_{y=1}^{C} p(y) \prod_{j \in W_i} p(z_{ij} | y, w_j)}$$

where $p(y_i)$ is the prior class probability and $p(z_{ij}|y_i,w_j)$ is a model of imperfect guesses.

One way to model annotator skills is with a single parameter that captures the annotator's probability of providing a correct answer, regardless of the class annotation. Using a Bernoulli distribution for the probability of annotator being correct $m_j$ with other responses having probability proportional to class priors:

$$p(z_{ij} | y_i, w_j) = \begin{cases} m_j & \text{if } z_{ij} = y_i \\ (1-m_j)p(z_{ij}) & \text{otherwise} \end{cases}$$

To prevent over fitting in low data situations, beta priors $\text{Beta}(n_\beta p^c, n_\beta(1-p))$ can be placed on $m_j$, where $n_\beta$ is the strength of the prior. $p^c$ represents the probability of any annotator providing a correct annotation (e.g. an annotation corresponding to a label identifying the ground truth) and can be estimated by pooling all annotator annotations together. Beta prior $\text{Beta}(n_\beta p, n_\beta(1-p))$ can be placed on $p^c$, with p representing the prior belief on annotator performance. In many embodiments, annotator skills are modeled by counting the number of times the annotator's response agrees with the predicted annotation, weighted by the prior strength:

$$m_j = \frac{n_\beta p^c + \sum_{i \in \mathcal{I}_j} 1[z_{ij} = \bar{y}_i, |W_i| > 1] - 1}{n_\beta + \sum_{i \in \mathcal{I}_j} 1[\bar{y}_i, |W_i| > 1] - 2}$$

where $1[\cdot]$ is the indicator function, $\mathcal{L}_j$ are the pieces of source data annotated by annotator j, and $y_i$ is the current predicted label for source data i. The pooled prior $p^c$ can be estimated similarly as appropriate to the requirements of specific applications of embodiments of the invention.

In a number of embodiments, a separate binomial model can be generated for each value of y, resulting in a skill vector $M_j$ for each annotator:

$$p(z_{ij} | y_i, w_j) = \begin{cases} M_j(y_i) & \text{if } z_{ij} = y_i \\ (1-M_j(y_i))p(z_{ij}) & \text{otherwise} \end{cases}$$

Similar to the single binomial model, a tiered prior system can be employed by adding a per class beta prior $\text{Beta}(n_\beta p^y, n_\beta(1-p^y))$ on $M_j(y)$. A beta prior $\text{Beta}(n_\beta p, n_\beta(1-p))$ on $p^y$ can encode the prior belief that an annotator is correct on any particular class (e.g. label). Estimating the annotator skill parameters $M_j(y)$ and the pooled priors $p^y$ for class y can be calculated using techniques similar to those in the single binomial model described above.

Multinomial models can also be generated. In several embodiments, a more model of $p(z_{ij}|y_i,w_i)$ could assume $w_j$ encodes a $C \times C$ confusion matrix $M_j$, where an entry $M_j(m,n)$ denotes annotator j's probability of predicting class n when the true class is m. Here, $p(z_{ij}|y_i,w_i)=M_j(y_i,z_{ij})$. In a variety of embodiments, $p(z_{ij}|y_i,w_i=c, w_j)$ is a multinomial distribution with parameters $\mu_j^c=[M_j(c, 1), \ldots, M_j(c, C)]$ for each value of c. Dirichlet priors $\text{Dir}(n_\beta \alpha^c)$ can be placed on $\mu_j^c$, where n is the strength of the prior and $\alpha^c$ is estimated by pooling across all annotators. Dirichlet prior $\text{Dir}(n_\beta \alpha)$ can be placed on $\alpha^c$, with a acting as a global hyper-parameter that provides the likelihood of any annotator annotating a class correctly. Because the Dirichlet distribution is the conjugate prior of the multinomial distribution, the computation of each entry k from 1 ... C in the skill vector $\mu^c$ for a single annotator j and each class c is done by counting agreements:

$$\mu_{j,k}^c = \frac{n_\beta \alpha_k^c + \sum_{i \in I_j} 1[z_{ij}=k, \bar{y}_i=k, |W_i|>1] - 1}{n_\beta \alpha_0^c + \sum_{i \in I_j} 1[\bar{y}_i=k, |W_i|>1] - C}$$

where $\alpha_0^c = \Sigma_k \alpha_k^c$. In a number of embodiments, the pooled annotator parameters $\alpha^c$ are estimated in a similar way.

Multinomial models are useful because they model commonly confused classes, however they have far more parameters than the binomial models. These models quickly become intractable as the total number of classes C gets large. For example, if there are $10^4$ classes, a matrix with $10^8$ entries would be modeled for each annotator. This is statistically and computationally intractable. However, when the number of classes gets large, there often exists a taxonomy used to organize them. This taxonomy can be used to reduce the number of parameters in a multinomial model.

With a taxonomy of classes that is L levels deep, a confusion matrix can be associated with each node in the taxonomy. For example, if the genus of an observation is known, each annotator can have a confusion matrix among species within that genus. For the taxonomic model, let $y_i^l$ denote the node in the taxonomy at level l that class $y_i$ belongs to, such that $y_i^0$ is the root node and $y_i^L$ is the leaf node. In a variety of embodiments, a leaf node includes the label for a particular piece of source data, e.g. a species label. Similarly, let $z_{ij}^0$ denote the node in the taxonomy at level l that class $z_{ij}$ belongs to. In this model, $$p(z_{ij}^l | y_i^l, w_j, z_i^{l-1} = z_{ij}^{l-1}) = M_j^{y_i^{l-1}}(y_i^l, z_{ij}^l)$$

where $$M_j^{y_i^{l-1}}$$

is a confusion matrix associated with node $y_i^{l-1}$ in the taxonomy; the assumption is that for each value of $y_i^l$, $z_{ij}^l$ is multinomial with a vector $$M_j^{y_i^{l-1}}(y_i^l, :)$$

of parameters of size equal to the number of child nodes. The term $y_i^{l-1}=z_{ij}^{l-1}$ denotes the condition that the parent node classification is known. However, when the annotator is wrong about both the species and genus, $$p(z_{ij}^l | y_i^l, u_j^l, y_i^{l-1} \neq z_{ij}^{l-1})$$

is also modeled. In this model it is assumed that annotator j predicts each class $z_{ij}^l$ with some probability irrespective of the true class, which can be expressed as $$p(z_{ij}^l | y_i^l, w_j, z_i^{l-1} \neq z_{ij}^{l-1}) = N_j^{z_{ij}^{l-1}}(z_{ij}^l)$$

being multinomial with a parameter for each possible child node. The taxonomic model results in the following values:

$$p(z_{ij} | y_i, w_j) = \prod_{l=1}^{L} p(z_{ij}^l | y_i^l, w_j),$$

$$p(z_{ij}^l | y_i^l, w_j) = \begin{cases} M_j^{y_i^{l-1}} & \text{if } y_i^{l-1} = z_{ij}^{l-1} \\ N_j^{z_{ij}^{l-1}}(z_{ij}^l) & \text{otherwise} \end{cases}$$

Note that in totality, for each node n in the taxonomy, a confusion matrix $M_j^n$ can be associated with a row for each child of n and a vector of probabilities $N_j^n$ with an entry for each child. If the taxonomy is relatively balanced, this is far fewer parameters than the flat multinomial model as the model is linear in the number of classes rather than quadratic. To make estimating annotator parameters more robust, a tiered system of priors (e.g., Dirichlet priors on all multinomial parameters) can be used. In many embodiments, the priors are computed by pooling across all annotators at each node. However, if this is still too any parameters, the priors can be modeled by assuming the probability that an annotator is correct, a binomial distribution with a parameter per child node or even just one parameter for all children, assuming other class responses $y_i^l \neq z_{ij}^l$ have probability proportional to their priors.

In a variety of embodiments, an annotator can predict an internal node in the taxonomy if the annotator is unsure of the exact class. Let $\text{level}(z_{ij})$ be the level of this prediction. In several embodiments, $z_{ij}^l$ is valid only for $1 \leq \text{level}(z_{ij})$. The taxonomic model then utilizes $$p(z_{ij}|y_i,w_j) = \prod_{l=1}^{\text{level}(z_{ij})} p(z_{ij}^l|y_i^l,w_j).$$

This can model performance when annotators provide different levels of taxonomic predictions as appropriate to the requirements of specific applications of embodiments of the invention.

Annotator skill can also be modeled when the annotator has access to annotations provided by prior annotators. Given an observation $x_i$ and an initial identification $z_{ij}^1$, where $j_i^t$ denotes the tth annotator that annotated source data i. Each subsequent identifier $j_i^t$, $t>1$ can see the details of the observation $x_i$ and all annotations made by previous annotators $H_i^{t-1} = \{z_{i,j_i 1}, \ldots, z_{i,j_i^{t-1}}\}$. Annotators can assess the experience of a previous annotator j by viewing observations $X_j$ and all of their annotations $Z_j$. In this setting $$p(y_i | Z_i) = p(y_i | H_i^{|W_i|}) = \frac{p(y_i) \prod_{t=1}^{|W_i|} p(z_{i,j_i^t} | y_i, H_i^{t-1}, w_{j_i^t})}{\sum_{y=1}^{C} p(y) \prod_{t=1}^{|W_i|} p(z_{i,j_i^t} | y, H_i^{t-1}, w_{j_i^t})}$$

There are many possible choices for modeling $$p(z_{i,j_i^t} | y_i, H_i^{t-1}, w_{j_i^t})$$

The simplest option could assume each annotator ignores all prior responses:

$$p(z_{i,j_i^t} | y_i, H_i^{t-1}, w_{j_i^t}) = p(z_{i,j_i^t} | y_i, w_{j_i^t})$$

In practice, however, annotator $j_i^t$'s response will likely be biased toward agreeing with prior responses $H_i^{t-1}$, making a prediction combining both evidence from analyzing prior responses and from observing the source data itself. The weight of this evidence should increase with the number of prior responses and could vary based on annotator $j_i^t$'s assessment of other annotator's skill levels. The model can weight annotator $j_i^t$ against each possible response $z_{i,j_i^t}$ (e.g. annotator $j_i^t$'s perception of the class of source data i) with a term $$p_{j_i^t}(H_i^{t-1} | z_{i,j_i^t})$$

e.g. annotator $j_i^t$'s perception of the probability of prior responses given that class.

$$p(z_{i,j_i^t} | y_i, H_i^{t-1}, w_{j_i^t})$$

can then be expressed as $$p(z_{i,j_i^t} | y_i, H_i^{t-1}, w_{j_i^t}) = \frac{p(z_{i,j_i^t}, H_i^{t-1} | y_i, w_{j_i^t})}{p(H_i^{t-1} | y_i, w_{j_i^t})} = \frac{p(z_{i,j_i^t} | y_i, w_{j_i^t}) p_{j_i^t}(H_i^{t-1} | z_{i,j_i^t}, w_{j_i^t})}{\sum_z p(z | y_i, w_{j_i^t}) p_{j_i^t}(H_i^{t-1} | z, w_{j_i^t})}$$

where $p(z_{i,j_i^t} | y_i, w_{j_i^t})$ is modeled using processes similar to those described above. Annotator $j_i^t$ might choose to treat each prior response as independent sources of information"

$$p_{j_i^t}(H_i^{t-1} | z_{i,j_i^t}, w_{j_i^t}) = \prod_{s=1}^{t-1} p_{j_i^t}(z_{i,j_i^s} | z_{i,j_i^t}, w_{j_i^s})$$

where $w_k^j$ denotes parameters for annotator j's perception of annotator k's skill.

Alternatively, annotator j may choose to account for the fact that earlier responses were also biased by prior responses, resulting in a recursive definition/computation of $$p(z_{i,j_i^t} | y_i, H_i^{t-1}, w_{j_i^t})$$

as $$\begin{cases} \frac{p_{j_i^t}(z_{i,j_i^{t-1}} | z_{i,j_i^t}, w_{j_i^{t-1}}^{j_i^t}) p_{j_i^{t-1}}(H_i^{t-2} | z_{i,j_i^{t-1}}, w_{j_i^{t-2}}^{j_i^{t-1}})}{\sum_z p_{j_i^t}(z | z_{i,j_i^t}, w_{j_i^{t-1}}^{j_i^t}) p_{j_i^{t-1}}(H_i^{t-2} | z, w_{j_i^{t-2}}^{j_i^{t-1}})} & \text{if } t > 1 \\ p_{j_i^t}(z_{i,j_i^{t-1}} | z_{i,j_i^t}, w_{j_i^{t-1}}^{j_i^t}) & \text{if } t = 1 \end{cases}$$

Additionally, probabilities of the form $p(z_k | z_j, w_k^j)$—annotator j's perception of annotator k's responses—can be modeled. One model that keeps the number of parameters low is a binomial distribution, where annotator j assumes other annotators are correct with probability $\rho_j$. When they are incorrect, they respond proportionally to class priors:

$$p_j(z_k | z_j, w_k^j) = \begin{cases} \rho_j & \text{if } z_k = z_j \\ (1 - \rho_j) p(z_j) & \text{otherwise} \end{cases}$$

In many embodiments, a machine classifier can model the source data using parameters θ that can predict the probability of each class occurring, where $p(y_i)$ becomes $p(y_i | x_i, \theta)$. Any of a variety of machine classifiers, including those described herein, can be utilized to model the source data as appropriate to the requirements of specific applications of embodiments of the invention. In a number of embodiments, features can be extracted from a CNN and used to train the weights of a linear SVM using a one-vs-rest strategy followed by probability calibration using Platt scaling. Stratified cross-validation can be utilized to construct training and validation splits that contain at least one sample from each class. In several embodiments, models are initialized with uniform class priors, a probability of 0.5 that an annotator will annotate a class correctly, and a probability of 0.8 that a machine classifier will annotate a class correctly, giving Dirichlet priors a value of 0.8 at the true class index and 0.003 otherwise for the machine classifiers.

Figure 7:
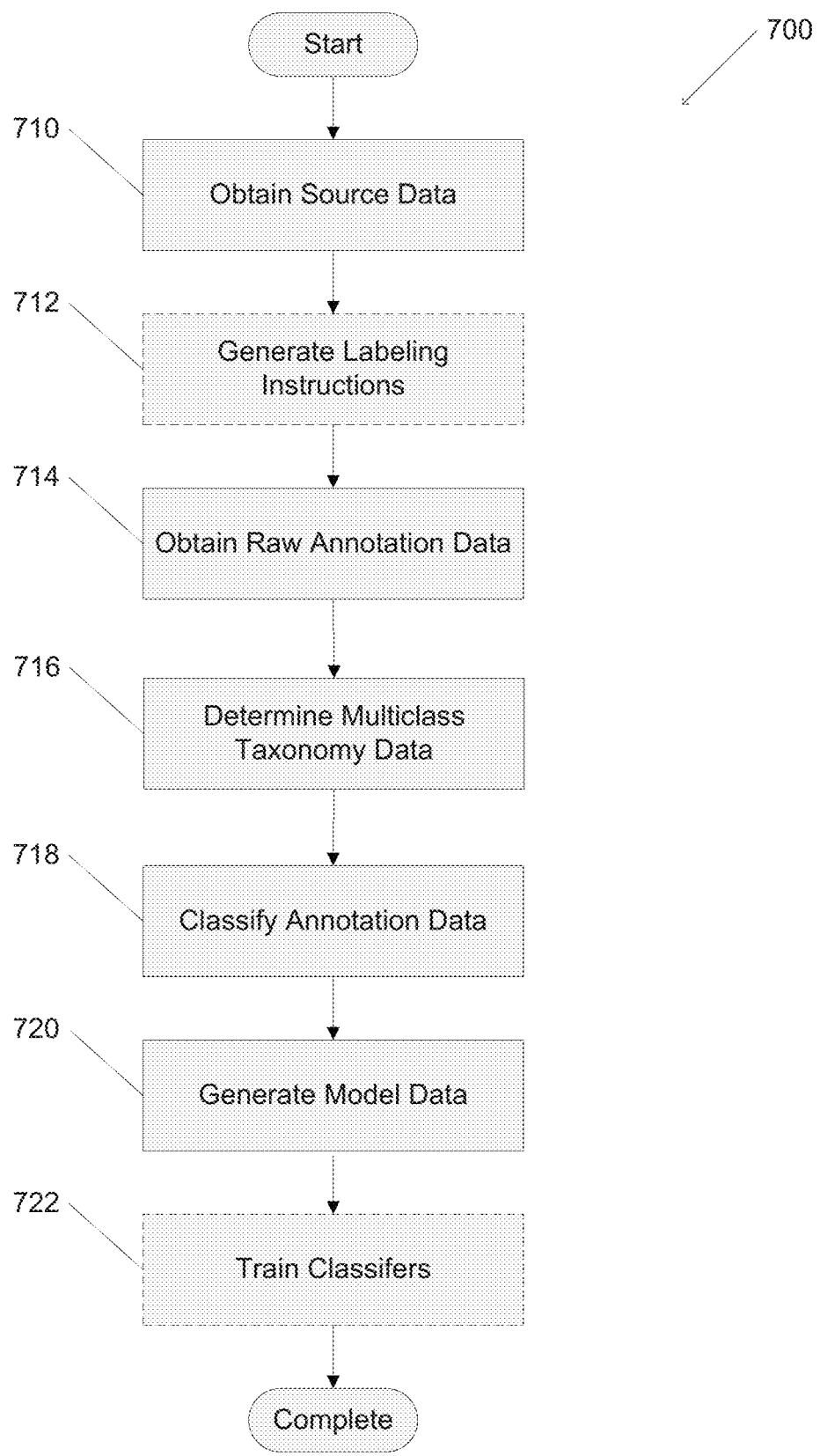
FIG. 7 is a flow chart conceptually illustrating a process for annotating data with multiclass annotations in accordance with an embodiment of the invention.

Turning now to FIG. 7, a process for annotating source data with multiclass annotations in accordance with an embodiment of the invention is shown. The process 700 includes obtaining (710) source data and, in many embodiments, generating (712) labeling instructions. Raw annotation data is obtained (714), multiclass taxonomy data is determined (716), annotation data is classified (718), and annotator model data and/or source model data is generated (720). In a variety of embodiments, a machine classifier is trained (722).

Specific processes for multiclass annotation of source data in accordance with embodiments of the invention are described with respect to FIG. 7; however, any of variety of processes, including those that utilize priors other than Dirichlet priors or alternative machine classifiers, can be utilized as appropriate to the requirements of specific applications of embodiments of the invention.

Training Machine Classifiers

A variety of multiclass data annotation processes include training machine classifiers to annotate source data based on new annotations incrementally obtained over time. In many embodiments, a machine classifier is trained each time a set of annotations is received for a set of source data. Currently predicted annotations for each piece of source data with at least one prior annotation can be used as training data for a machine classifier. While the predicted annotations can be noisy when the number of annotations per piece of source data is below a threshold value, a post-training probability calibration step can be calculated to compensate for noisy machine classifications. In several embodiments, a K-fold cross validation can be used to calibrate the machine classifier. For each split k, (K−1)/K example annotations can be used for training and the remaining (k−1)/K examples for probability calibration. In a number of embodiments, pieces of source data with $|W_i|<1$ are filtered from both training and probability calibration; however, all 1/K pieces of source data can be used for outputting probability estimates $p(y_i|x_i, \theta_k)$, including pieces of source data with $|W_i|=0$. This procedure ensures that estimates $p(y_i|x_i, \theta_k)$ are produced using a model that wasn't trained on annotations from source data i.

It should be readily apparent to one having ordinary skill in the art that a variety of machine classifiers can be utilized including (but not limited to) decision trees, k-nearest neighbors, support vector machines (SVM), neural networks (NN), recurrent neural networks (RNN), convolutional neural networks (CNN), and/or probabilistic neural networks (PNN). RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In some embodiments of the invention, multi-class data annotation processes can be used to train the machine classifier. In a number of embodiments, a combination of machine classifiers can be utilized, more specific machine classifiers when available, and general machine classifiers at other times can further increase the accuracy of predictions.

Figure 8:
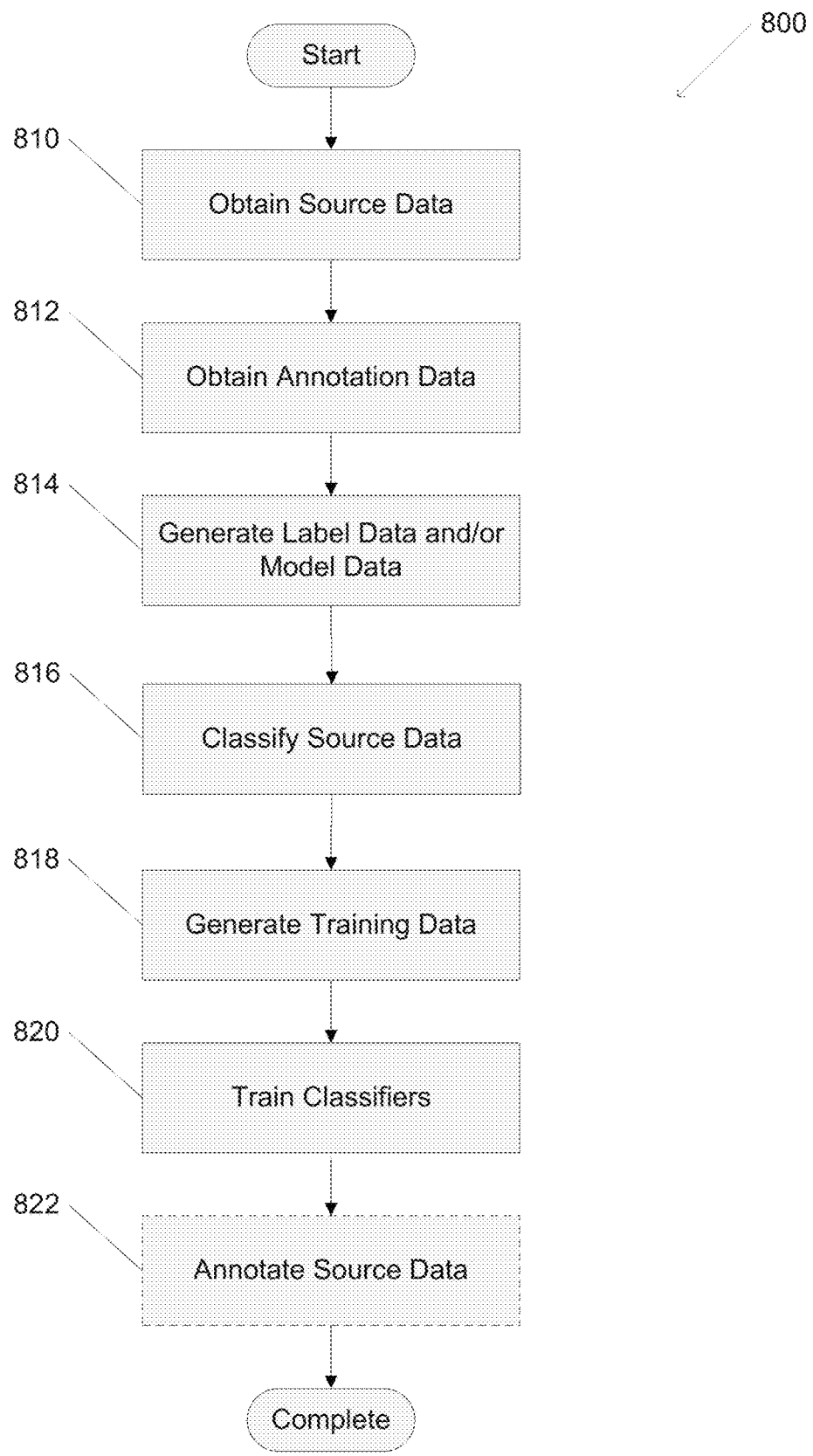
FIG. 8 is a flow chart conceptually illustrating a process for training a machine classifier in accordance with an embodiment of the invention.

Turning now to FIG. 8, a process for training a machine classifier in accordance with an embodiment of the invention is shown. The process 800 includes obtaining (810) source data, obtaining (812) annotation data, generating (814) annotator model data and/or source model data, and classifying (816) source data. Training data can be generated (818) and one or more classifiers can be trained (820). In a number of embodiments, source data is annotated (822) using the machine classifier.

Specific processes for training machine classifiers in accordance with embodiments of the invention are described with respect to FIG. 8; however, any of variety of processes, including those that utilize classifiers (or combinations thereof) other than those described above, can be utilized as appropriate to the requirements of specific applications of embodiments of the invention.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the annotator skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled annotator, except where expressly required. Accordingly, the scope of the invention should be determined not by the embodiments illustrated, but by the appended claims and their equivalents.

What is claimed is:

1. A data annotation server system, comprising:
    a processor; and
    a memory;
    wherein the processor:
        provides at least one subset of source data to at least two annotator devices, wherein each subset of source data includes multiple pieces of data;
        obtains a set of annotation data for each of the pieces of data in the at least one subset of a source data from the at least two annotator devices;
        classifies each piece of data in the source data using a machine classifier, the machine classifier comprising a linear support vector machine (SVM) classifying features identified using a convolutional neural network;
        generates annotator skill data describing the skill of each annotator device based on the set of annotation data and a classification of the source data from the machine classifier;
        estimates a difficulty of each piece of source data of the source data based on the set of annotation data and the classification of the source data from the machine classifier;
        generates a predicted label and a confidence level for each piece of data in the source data based on the annotator skill data, the set of annotation data, the classification of the source data from the machine classifier, and the difficulty of that piece of source data;
        if the confidence level for a certain piece of data in the source data is greater than or equal to a certain threshold, accepts the predicted label as an estimated ground truth for that piece of data; and
        trains the machine classifier using the annotator skill data, the set of annotation data, the predicted label, and the confidence level.

2. The data annotation server system of claim 1, wherein the processor further:
    generates active learning data for at least one subset of source data, where the active learning data comprises instructions for annotating each piece of data in the at least one subset of source data; and
    provides the active learning data to the at least two annotator devices.

3. The data annotation server system of claim 1, wherein the linear SVM classifying features identified using a convolutional neural network is followed by probability calibration using Platt scaling.

4. The data annotation server system of claim 3, wherein the machine classifier estimates the label data for each piece of source data by calculating the confidence in the set of annotation data for the piece of source data with a probability estimate $$p(y_i|x_i,\theta)=\sigma(\gamma\theta\cdot\phi(x_i))$$

where $\phi(x_i)$ is a CNN feature vector, $\theta$ is a learned SVM weight vector, $\gamma$ is probability calibration scalar from Platt scaling, and $\sigma(\ )$ is the sigmoid function.

5. The data annotation server system of claim 1, wherein the annotation data for each of the pieces of data comprises a location of the annotation within the piece of data.

6. The data annotation server system of claim 5, wherein the annotation data comprises a part keypoint annotation map, where $\mathbb{X}_i$ is a vector of length$|x_i|$ storing a value of $p(y_i|x_i, \theta)$ for each possible value of $y_i$, where $\mathbb{Z}_{ij}$ is a corresponding vector of length$|x_i|$ at each annotation location, and the vector $$\mathbb{Y}_i = \mathbb{X}_i \Pi_{j \in W_i} \mathbb{Z}_{ij}$$

stores a likelihood of all possible values of $y_i$.

7. The data annotation server system of claim 1, wherein the annotation data comprises a bounding box identifying a location of the annotation within each of the pieces of source data.

8. The data annotation server system of claim 7, wherein generating the confidence level for each piece of data in the source data comprises calculating risk associated with the annotation data associated with each piece of data in the source data by calculating when a pair of bounding boxes match by calculating if their area of intersection over union is at least 50%.

9. A method, comprising:
providing at least one subset of source data to at least two annotator devices, wherein each subset of source data includes multiple pieces of data;
obtaining a set of annotation data for each of the pieces of data in the at least one subset of a source data from the at least two annotator devices;
classifying each piece of data in the source data using a machine classifier, the machine classifier comprising a linear support vector machine (SVM) classifying features identified using a convolutional neural network;
estimating a difficulty of each piece of data of the source data based on the set of annotation data and a classification of the source data from the machine classifier;
generating annotator skill data describing the skill of each annotator device based on the set of annotation data and the classification of the source data from the machine classifier;
generating a predicted label and a confidence level for each piece of data in the source data based on the annotator skill data, the set of annotation data, the classification of the source data from the machine classifier, and the difficulty of that piece of source data;
if the confidence level for a certain piece of data is greater than or equal to a certain threshold, accepts the predicted label as an estimated ground truth for the source data; and
training the machine classifier using annotator skill data, the set of annotation data, the predicted label, and the confidence level.

10. The method of claim 9, further comprising:
generating active learning data for the at least one subset of source data, where the active learning data comprises instructions for annotating each piece of data in the at least one subset of source data; and
providing the active learning data to the at least two annotator devices.

11. The method of claim 9, wherein the linear SVM classifying features identified using a convolutional neural network is followed by probability calibration using Platt scaling.

12. The method of claim 11, wherein the machine classifier estimates the label data for each piece of source data by calculating the confidence in the set of annotation data for the piece of source data with a probability estimate $$p(y_i|x_i, \theta) = \sigma(\gamma \theta \cdot \phi(x_i))$$

where $\phi(x_i)$ is a CNN feature vector, $\theta$ is a learned SVM weight vector, $\gamma$ is probability calibration scalar from Platt scaling, and $\sigma()$ is a sigmoid function, and where $y_i$ is a true source data label and $x_i$ is the source data.

13. The method of claim 9, wherein the annotation data for each of the pieces of data comprises a location of the annotation within the piece of data.

14. The method of claim 13, wherein the annotation data comprises a part keypoint annotation map, where $\mathbb{X}_i$ is a vector of length$|x_i|$ storing a value of $p(y_i|x_i, \theta)$ for each possible value of $y_i$, where $\mathbb{Z}_{ij}$ is a corresponding vector of length$|x_i|$ at each annotation location, and the vector $$\mathbb{Y}_i = \mathbb{X}_i \Pi_{j \in W_i} \mathbb{Z}_{ij}$$

stores a likelihood of all possible values of $y_i$.

15. The method of claim 9, wherein the annotation data comprises a bounding box identifying a location of the annotation within the piece of source data.

16. The method of claim 15, wherein generating the confidence level for each piece of data in the source data comprises calculating risk associated with the annotation data associated with each piece of data in the source data by calculating when a pair of bounding boxes match by calculating if their area of intersection over union is at least 50%.

17. The data annotation server system of claim 1, wherein the processor further:
if the confidence level of a certain piece of data is less than the threshold:
provides another at least one subset of source data to another at least one annotator device;
obtains additional annotation data from the another at least one annotator device;
classifies each piece of data in the source data using the machine classifier;
generates other annotator skill data describing the skill of the other at least one annotator device based on the additional annotation data, the classification of the source data from the machine classifier, and the annotation data from the at least one annotator device; and
generates another predicted label and another confidence label for each piece of data in the source data based on the other annotator skill data, the additional annotation data, the annotation data from the at least one annotator device, the annotator skill data of the at least one annotator device, and the classification of the source data from the machine classifier; and
if the confidence level for a certain piece of data is greater than or equal to a certain threshold, accepts the other predicted label as an estimated ground truth for that piece of data.

18. The method of claim 9, further comprising:
if the confidence level of a certain piece of data is less than the threshold:
providing another at least one subset of source data to another at least one annotator device;
obtaining additional annotation data from the another at least one annotator device;
classifying each piece of data using the machine classifier;

generating other annotator skill data describing the skill of the other annotator device based on the additional annotation data, the classification of the source data from the machine classifier, and the annotation data from the at least one annotator device; and generating another predicted label and another confidence label for each piece of data in the source data based on the other annotator skill data, the additional annotation data, the annotation data from the at least one annotator device, the annotator skill data of the at least one annotator device, and the classification of the source data from the machine classifier; and if the confidence level for a certain piece of data is greater than or equal to a certain threshold, accepting the other predicted label as an estimated ground truth for the source data.

19. The data annotation server of claim 8, wherein calculating the confidence level for each piece of data in the source data comprises inverting the risk associated with the annotation data associated with each piece of data in the source data.

20. The method of claim 16, wherein calculating the confidence level for each piece of data in the source data further comprises inverting the risk associated with the annotation data associated with each piece of data in the source data.

* * * * *

UNITED STATES PATENT AND TRADEMARK OFFICE
CERTIFICATE OF CORRECTION

PATENT NO. : 11,449,788 B2
APPLICATION NO. : 15/925417
DATED : September 20, 2022
INVENTOR(S) : Pietro Perona, Grant Van Horn and Steven J. Branson It is certified that error appears in the above-identified patent and that said Letters Patent is hereby corrected as shown below:

In the Claims

Column 24 (Claim 1, Line 27) replace "a classification" with --the classification--.
Column 25 (Claim 9, Line 38) replace "a classification" with --the classification--.

Signed and Sealed this
Eighth Day of November, 2022

Katherine Kelly Vidal
*Director of the United States Patent and Trademark Office*